US00RE36112E

United States Patent [19]

Hano et al.

[11] E Patent Number: Re. 36,112

[45] Reissued Date of Patent: Feb. 23, 1999

[54] ELECTROPHOTOGRAPHIC APPARATUS CAPABLE OF SELECTIVELY USING CUT SHEET AND CONTINUOUS PAPER AND METHOD THEREFOR

[75] Inventors: Shigehiro Hano; Yoshihiro Chujo, both of Otsu; Takanobu Hagiwara, Urawa; Eizo Kanaya, Koka-gun; Yoshinobu Takatsuki, Otsu; Satoru Kato, Kitakoma-gun; Hajime Saegusa, Nakakoma-gun; Tetsuya Aiyama, Yamanashi; Hiroyuki Aonuma, Kofu; Shozo Yoshizawa, Iida; Naoki Kobayashi, Kofu; Koichi Sugihara; Akihito Dobashi, both of Nakakoma-gun, all of Japan

[73] Assignee: Toray Industries, Inc., Tokyo, Japan

[21] Appl. No.: 619,423

[22] Filed: Mar. 21, 1996

Related U.S. Patent Documents

Reissue of:

[64] Patent No.: 5,296,906
Issued: Mar. 22, 1994
Appl. No.: 929,523
Filed: Aug. 14, 1992

[51] Int. Cl.[6] ..... G03G 15/00

[52] U.S. Cl. ..... 399/385; 83/211

[58] Field of Search ..... 399/384, 385, 399/316, 317; 83/209–211, 272, 280, 370; 226/110

[56] References Cited

U.S. PATENT DOCUMENTS

| | | | |
|---|---|---|---|
| 4,929,982 | 5/1990 | Ainoya et al. | 399/167 |
| 4,941,377 | 7/1990 | Ishihara et al. | 83/211 |
| 5,061,967 | 10/1991 | Isobe | 399/316 |
| 5,065,196 | 11/1991 | Kanaya et al. | 399/343 |
| 5,105,227 | 4/1992 | Kitamura et al. | 399/317 |
| 5,113,228 | 5/1992 | Monma et al. | 399/317 |
| 5,194,903 | 3/1993 | Negishi et al. | 399/384 |

*Primary Examiner*—William J. Royer

[57] ABSTRACT

An electrophotographic apparatus of this invention includes a stacking section for cut sheet; a stacking section for fanfold paper; a feed section for supplying printing paper which is cut sheet or fanfold paper from one of the stacking sections via one of different supplying paths; an exposure unit for forming an electrostatic latent image on a photosesitive drum; a developing unit for developing the latent image into a toner image; a belt conveyer for conveying the printing paper received from the feed section along common feeding path, a transferring unit for transferring the toner image on the photosensitive drum onto the printing paper; a fixing unit for fixing the transferred toner image on the printing paper; an ejecting section for receiving the printed printing paper from the belt conveyer; and a cutting device for cutting apart the printed fanfold paper at the perforation line thereof. The fanfold paper left behind on the common feeding path after the cutting operation is set back to a position which does not obstruct supply of cut paper in the feed section.

59 Claims, 22 Drawing Sheets

TIMING CHART OF PRINTING PROCESS FOR CUT SHEET

TIMING CHART OF PRINTING PROCESS FOR FANFOLD PAPER

ELECTROPHOTOGRAPHIC APPARATUS CAPABLE OF SELECTIVELY USING CUT SHEET AND CONTINUOUS PAPER AND METHOD THEREFOR

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an electrophotographic apparatus in which cut sheet and continuous paper such as fanfold paper and rolled paper can be selectively used, and a method for electrophotographic process on the cut sheet and continuous paper.

2. Description of the Related Art

An electrophotographic apparatus designed to selectively print data on cut sheet or continuous paper is disclosed in U.S. Pat. Nos. 4,929,282 and 4,941,377, for example. The electrophotographic apparatus disclosed in the above U.S.P. documents includes a common paper feeding path for feeding one of the printing papers of cut sheet and continuous paper and effects the electrophotographic process for the printing paper in the process of feeding the printing paper along the common paper feeding path. That is, while the printing paper is fed along the common paper feeding path, a toner image is transferred to the printing paper when it comes to an image transferring position which is previously determined on the common feeding path and then the toner image is fixed on the printing paper in the fixing position which is defined on the downstream side of the transferring position.

In the known electrophotographic apparatus, paths for supplying cut sheet and continuous paper to the common feeding path are different and methods for supplying paper in the respective supplying paths are different from each other. As a result, when a print starting command signal is generated and cut sheet or continuous paper is fed to the transferring position on the common feeding path via the corresponding paper supplying path, transferring timings at which the cut sheet and continuous paper are fed to the transferring position after generation of the print starting command signal are different from each other. Therefore, if the transferring timing is determined according to the feeding operation of one of the two types of printing papers, then it becomes impossible to correctly transfer a toner image onto the other type printing paper. In this case, if flash light is used for fixing the toner image, not only the transferring timing but also the fixing timing is deviated and part of the toner image may be kept unfixed.

When a flash type fixing unit is used, the quality of fixing may be deteriorated unless uniform light energy is applied to the toner image on the printing paper or to the printing surface.

Further, when continuous paper is used, it is preferable to automatically cut off the continuous paper after a sequence of printing operations is effected. However, when fanfold paper is used as the continuous paper, the perforation line of the fanfold paper to be cut off must be aligned with the cutting position, making it difficult to correctly cut off the fanfold paper.

SUMMARY OF THE INVENTION

An object of this invention is to provide an electrophotographic apparatus and a method with which the above problems can be solved, cut sheet and continuous paper can be easily dealt with, the printing operation for respective types of printing papers can be adequately effected and fanfold paper can be automatically cut off when the fanfold paper is used.

The above object can be attained by an electrophotographic apparatus of this invention, and the apparatus comprises the following means as the basic means, that is, first supplying means for supplying cut sheet as printing paper towards a common feeding path; second supplying means for supplying continuous paper as printing paper towards the common feeding path; feeding means for feeding the printing paper supplied from one of the first and second supplying means; image forming means for forming an electrostatic latent image on a photosensitive medium; developing means for developing the latent image on the photosensitive medium into a toner image; transferring means for transferring the toner image from the photosensitive medium onto the printing paper lying on the common feeding path at a preset transferring position; and fixing means for fixing the transferred toner image on the printing paper at a preset fixing position on the common feeding path.

The above object can be attained by further providing cutting means capable of cutting continuous paper at a cutting position set on the downstream side of the fixing position with respect to the feeding direction of the paper and retracting means for drawing back the cut end of the continuous paper which is left behind on the common feeding path after the continuous paper cutting operation to a position which lies on the upstream side of the common feeding path and does not prevent supply of the cut sheet by the first supplying means, in addition to the basic means of the above electrophotographic apparatus.

According to the above electrophotographic apparatus, continuous paper is cut off after the printing operation for the continuous paper is completed, and the upstream side portion of the continuous paper is automatically removed from the common feeding path. Therefore, so-called paper parking of the continuous paper may be automatically effected, and after this, the printing operation for cut sheet can be immediately started.

The electrophotographic apparatus further includes separation means for separating the common feeding path from the photosensitive medium when the continuous paper is drawn back. It is preferable for the separation means to separate the common feeding path not only from the photosensitive medium but also from the fixing means. If such separation means is operated when the continuous paper is drawn back, interference which may be caused by the continuous paper on the photosensitive medium and fixing means can be avoided.

In order to deal with fanfold paper which is used as the printing paper, the cutting means includes means for aligning one of the perforation lines of the fanfold paper which is to be cut off with the preset cutting position, holding means for holding portions of the fanfold paper which respectively lie on the upstream and downstream sides with respect to the aligned perforation line, and a cutting member for cutting off the fanfold paper at the aligned perforation line by pulling the fanfold paper in a direction perpendicular to the perforation line while being moved along the aligned perforation line.

Even when the perforation line of the fanfold paper is not exactly set, the cutting member of the cutting means can apply a pulling force to a portion of the fanfold paper near the aligned perforation line. Therefore, at the time of cutting off the fanfold paper, it is not necessary to exactly align the perforation line with the preset cutting position and the cutting operation can be easily effected.

The object of this invention can be attained not only by the apparatus having the cutting means and retracting means but also by a electrophotographic method having additionally the functions of the above cutting means and retracting means.

Another object of this invention is attained by an electrophotographic method which comprises the following steps as the basic steps, that is, a supplying step of selecting one of cut sheet and continuous paper as a printing paper and supplying the selected printing paper towards a common feeding path; an image forming step of forming an electrostatic latent image of a photosensitive medium; a developing step of developing the latent image on the photosensitive medium into a toner image; a transferring step of transferring a toner image on the photosensitive medium to the printing paper at a transferring position set on the common feeding path when the printing paper is fed along the common feeding path, and a fixing step of fixing the transferred toner image on the printing paper at a fixing position set on the common feeding path.

In order to attain the above object, the method further includes an outputting step of outputting one of different timing signals for the transferring step according to the type of the selected printing paper prior to one of the supplying step and the transferring step in addition to the above basic steps. With the above outputting step, the transferring step can be adequately effected for the selected printing paper with the timing signal used as a reference.

Further, in order to attain the above object, the fixing step is effected by use of a fixing unit. The fixing unit has a flash lamp disposed therein and a light energy distribution in which 70 to 80% of the total emission energy is concentrated on a central portion of 50% of an area illuminated by flash light with respect to a feeding direction of the printing paper each time flash light is emitted from the flash lamp.

If the feeding speed of the printing paper is v, the length of a portion of the printing paper on which 70% of the total emission energy is concentrated in the feeding direction is W, the triggering frequency of the flash lamp is f, and the number of light emitting operations of the flash lamp is n, then the following equation is obtained.

$$v/f=n\cdot W$$

In this case, the number n of light emitting operations is set within a range of 1.2 to 1.8.

If the number n of emission times of the flash light is set as described above, flash lights can be applied to the printing paper passing by the flash lamp in an adequately superposed manner, and as a result, uniform light energy can be applied to the printing paper in the feeding direction.

These and other objects, features and advantages of the present invention will become apparent from the Detailed Description of the Invention when considered in conjunction with the accompanying Drawings. In this case, the drawings only show an example and this invention is not limited thereto.

DETAILED DESCRIPTION OF THE PREFERRED EMBODIMENTS

Figure 1:
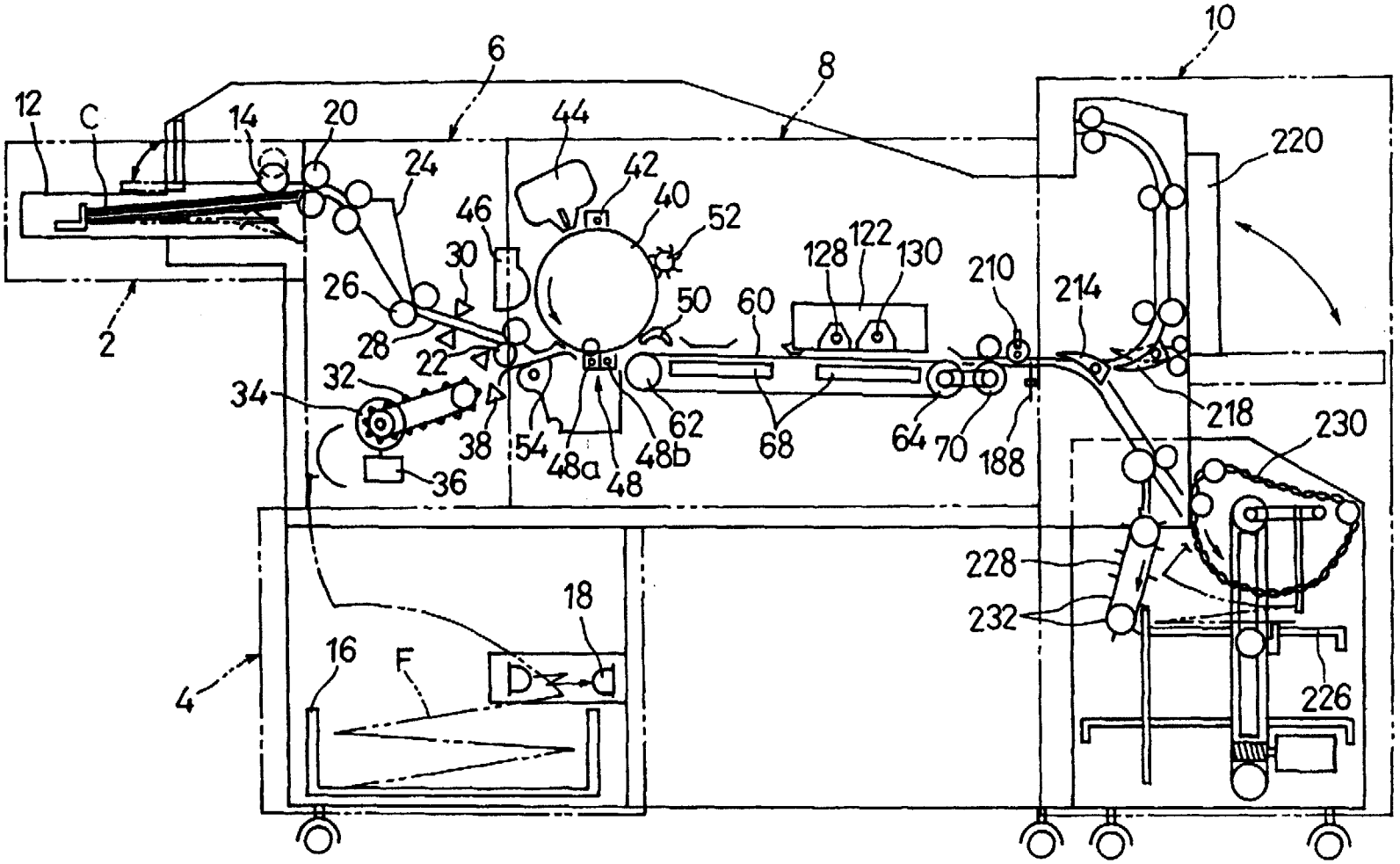
FIG. 1 is a schematic view showing an electrophotographic apparatus according to one embodiment of this invention.

As shown in FIG. 1, an electrophotographic apparatus roughly includes paper stacking sections 2 and 4, feeding section 6, printing section 8, and paper ejecting section 10.

The stack section 2 is arranged in an upper position and the stack section 2 has a tray 12. A large number of sheets of cut paper C are stacked and stored in the tray 12. A take-out roller 14 is disposed above the tray 12 and is positioned near the feeding section 6. Further, the take-out roller 14 is set in contact with one of the cut sheets C which lies in the topmost position in the tray 12. Therefore, when the take-out roller 14 is rotated, the cut sheet in the tray 12 is sequentially taken out one at a time and supplied towards the succeeding stage or the feeding section 6.

The other stack section 4 is disposed below the stack section 2 and the stack section 4 also has a tray 16. Fanfold paper F is set in a folded form in the tray 16. An end sensor 18 which is an optical sensor having a light emitting element and a light receiving element is disposed above the tray 16.

The feeding section 6 receives printing paper supplied from a selected one of the stack sections 2 and 4 and supplies the received printing paper towards the printing section 8. That is, the feeding section 6 has a pair of separation rollers 20 disposed on the side of the stack section 2. The separation rollers 20 are disposed near the take-out roller 14 and rotated in opposite directions. Therefore, as described before, when the take-out roller 14 is rotated, the cut sheet C taken out from the tray 12 passes through between the separation rollers 20. The separation rollers 20 permit only one of cut sheet C supplied from the tray 12 to pass through therebetween. Thus, the cut sheet C is supplied to the feeding section 6 one at a time.

A pair of feed rollers 22 are disposed on the downstream side of the separation rollers 20 with respect to the feeding direction of the cut sheet C and are disposed in the boundary between the feeding section 6 and the printing section 8. Further, a register guide 24 formed in a plate-like form, a pair of register rollers 26 and a pair of introducing guides 28 are arranged in this order as viewed from the separation roller 20 side between the separation rollers 20 and the feeding rollers 22.

The cut sheet C is fed from between the separation rollers 20, the front end of the cut sheet C strikes against the paired register rollers 26 and the feed of the cut sheet is temporarily stopped. Therefore, the cut sheet C is bent with the rear end portion thereof pressed against the register guide 24, and as a result, the feeding posture of the cut sheet C is corrected so that the front end of the cut sheet C may be set parallel to the axial line of the paired register rollers 26. That is, at this time, the so-called register correction of the cut sheet C is effected.

After this, when the paired register rollers 26 are rotated, the cut sheet C is fed through between the paired register rollers 26, and is guided towards the feeding rollers 22 by the paired introducing guides 28, and then supplied to the printing section 8 by means of the feeding rollers 22.

An end sensor 30 is arranged between the register rollers 26 and the feeding rollers 22. Also, the end sensor 30 has a light emitting element and a light reception element which are disposed with the feeding path of the cut sheet C, that is, introducing guides 28 disposed therebetween.

A tractor unit 32 is disposed in the lower position of the feeding section 6. The fanfold paper F stored in the tray 16 passes through between the light emitting element and the light reception element of the end sensor 18 and is guided to the tractor unit 32.

As is well known in the art, the tractor unit 32 has a pair of tractor belts and the feeding claws of the tractor belt are inserted into the feed holes formed on both side portions of the fanfold paper F. Therefore, the tractor unit 32 feeds the fanfold paper F towards the printing section 8 by sequentially inserting the feeding claws into the feed holes while the tractor belt is being driven.

A rotary encoder 34 is mounted on the driving shaft of the tractor unit 32 and electrically connected to a counter 36. When the driving shaft of the tractor unit 32 is rotated in the feeding direction of the fanfold paper F, the counter 36 accumulatively adds the number of pulses output from the rotary encoder 34 to the count thereof, and when the driving shaft of the tractor unit is rotated in the opposite direction, the counter 36 subtracts the number of pulses from the count thereof. As a result, the count thereof or the accumulated value of the number of pulses indicates the traveling distance of the fanfold paper F supplied from the tractor unit 34 to the printing section 8.

Further, an end sensor 38 is disposed immediately at the front side of the tractor unit 32 with respect to the feeding direction of the fanfold paper F and the light emitting element and light reception element of the end sensor 38 are arranged with the feeding path of the fanfold paper F disposed therebetween.

In the printing section 8, a photosensitive drum 40 is disposed on the side near the feeding section 6 and rotated at a constant speed in the counterclockwise direction in FIG. 1. A charging unit 42, exposure unit 44, developing unit 46, transferring/de-electrifying unit 48, peeling claw 50 and cleaning unit 52 are arranged in this order around the photosensitive drum 40 in the rotating direction from a position directly above the photosensitive drum 40.

With the rotation of the photosensitive drum 40, the charging unit 42 charges the outer peripheral surface or the photosensitive surface of the photosensitive drum 40, and after this, the photosensitive surface is exposed by the exposure unit 44. The exposure unit 44 includes an LED array having light emitting diodes (LEDs) arranged in a row and the LED array emits a light beam towards the photosensitive surface so as to form an electrostatic latent image on the photosensitive surface according to image data supplied from a computer.

The electrostatic latent image formed on the photosensitive surface is developed into a toner image by the developing unit 46. After this, the toner image is transferred to the printing paper which is attached to and fed on the photosensitive drum 40 by means of a transfer section 48a of the transferring/de-electrifying unit 48.

After the toner image is transferred, the printing paper is applied with an A.C. voltage from a de-electrifying section 48b of the transferring/de-electrifying unit 48 and charges of the printing paper are rapidly discharged. As a result, the printing paper is adequately peeled from the photosensitive drum 40. Thereafter, the remaining toner on the photosensitive surface of drum 40 is removed by means of the cleaning unit 52.

The peeling claw 50 functions to prevent the printing paper which is now fed on the photosensitive drum 40 from being wound on the photosensitive drum 40.

The printing paper is either the cut sheet or fanfold paper respectively supplied from the stacking section 2 or 4.

Figure 2:
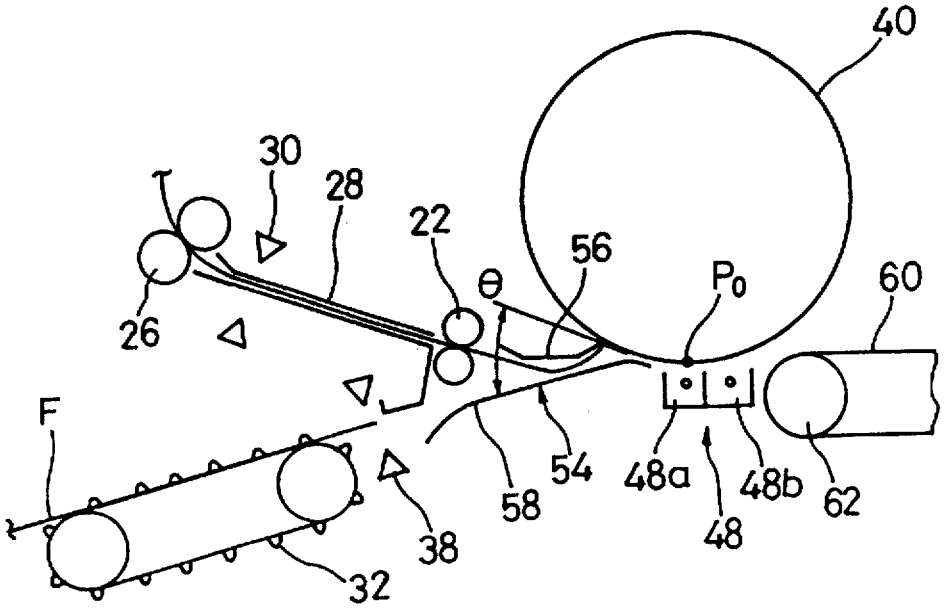
FIG. 2 is an enlarged view showing a photosensitive drum of FIG. 1 and members disposed around the photosensitive drum.

A confluence guide 54 is disposed between the feeding section 6 and the photosensitive drum 40 and is shown in detail in FIG. 2.

The confluence guide 54 has a pair of guide plates 56 and 58 respectively disposed in the upper and lower portions and a space between the guide plates defines part of the feeding path of the printing paper. The upstream side end of the upper guide plate 56 which lies near the feed rollers 22 is bent in an upward direction and the upstream side end of the lower guide plate 58 which lies near the end sensor 38 is bent in a downward direction. With this structure, an inlet port defined between the upstream side ends of the paired guide plates 56 and 58 is fully opened in the vertical direction The cut sheet C which has passed through between the feed rollers 22 is guided by the upstream side end of the upper guide plate S6 and fed into a space between the guide plates 56 and 58, and the fanfold paper F which has been fed from the tractor unit 32 is guided by the upstream side end of the lower guide plate 58 and fed into between the guide plates As is clearly seen from FIG. 2, the lower guide plate 58 is made longer than the upper guide plate 56 and the downstream side end of the lower guide plate 58 is set near the transferring position P0 of the photosensitive drum 40, that is, near the transfer section 48a. Further, the downstream side end of the lower guide plate 58 is bent in a convex form towards the photosensitive surface so as to be close to the photosensitive surface of the photosensitive drum 40. Therefore, when a line segment which contains the downstream side end of the lower guide plate 58 and is tangent to the photosensitive surface is considered, an angle θ made by the line segment and the flat central portion of the lower guide plate 58 is set so that the printing paper may be adequately and forcedly guided towards the transferring position P0.

The downstream side end of the upper guide plate 56 is formed in a triangular form projecting towards the photosensitive drum 40 and an angle made by part of the downstream side end of the upper guide plate which lies on the side of the photosensitive drum 40 and the central portion of the lower guide plate 58 is also set to θ.

Therefore, as shown in FIG. 2, even if the front end portion of the cut sheet C is bent upwardly after the cut sheet C has passed through between the feed rollers and the sheet is guided between the guide plates 56 and 58 with this condition kept unchanged, the front end portion of the cut paper C is forcedly guided towards the downstream end of the lower guide plate 58 by the downstream end of the upper guide plate 56 as shown by broken lines in FIG. 2, and as a result, the cut paper C can be adequately guided to the transferring position P0.

As is clearly understood from FIG. 1, the function of the downstream side end of the upper guide plate 56 becomes significantly effective when the stacking section of the cut sheet C is disposed above the photosensitive drum 40 and therefore the inclination angle of the introducing guide 28 is set to be large.

A belt conveyer 60 is disposed near the photosensitive drum 40 and horizontally extends in a direction from a position near the transferring position P0 to the ejecting section 10. The belt conveyer 60 includes rollers 62 and 64 which are disposed in different positions in the feeding direction of the printing paper and a plurality of conveyer belts 66 stretched between the rollers 62 and 64. As is more clearly understood by referring to FIG. 3, each of the conveyer belts 66 has a large number of suction holes 67 and a pair of suction devices 68 are disposed between the forward movement belt section and reverse movement belt section of the conveyer belts 66 in different positions in the feeding direction. The suction devices have suction fans (not shown) disposed therein and the suction fans cause air flow from the upper side towards the lower side.

Therefore, the printing paper which has passed the photosensitive drum 40 is fed towards the succeeding stage ejecting section 10 by driving the conveyer belt 66 while it is attached to the conveyer belt 66 of the conveyer by suction force.

Figure 3:
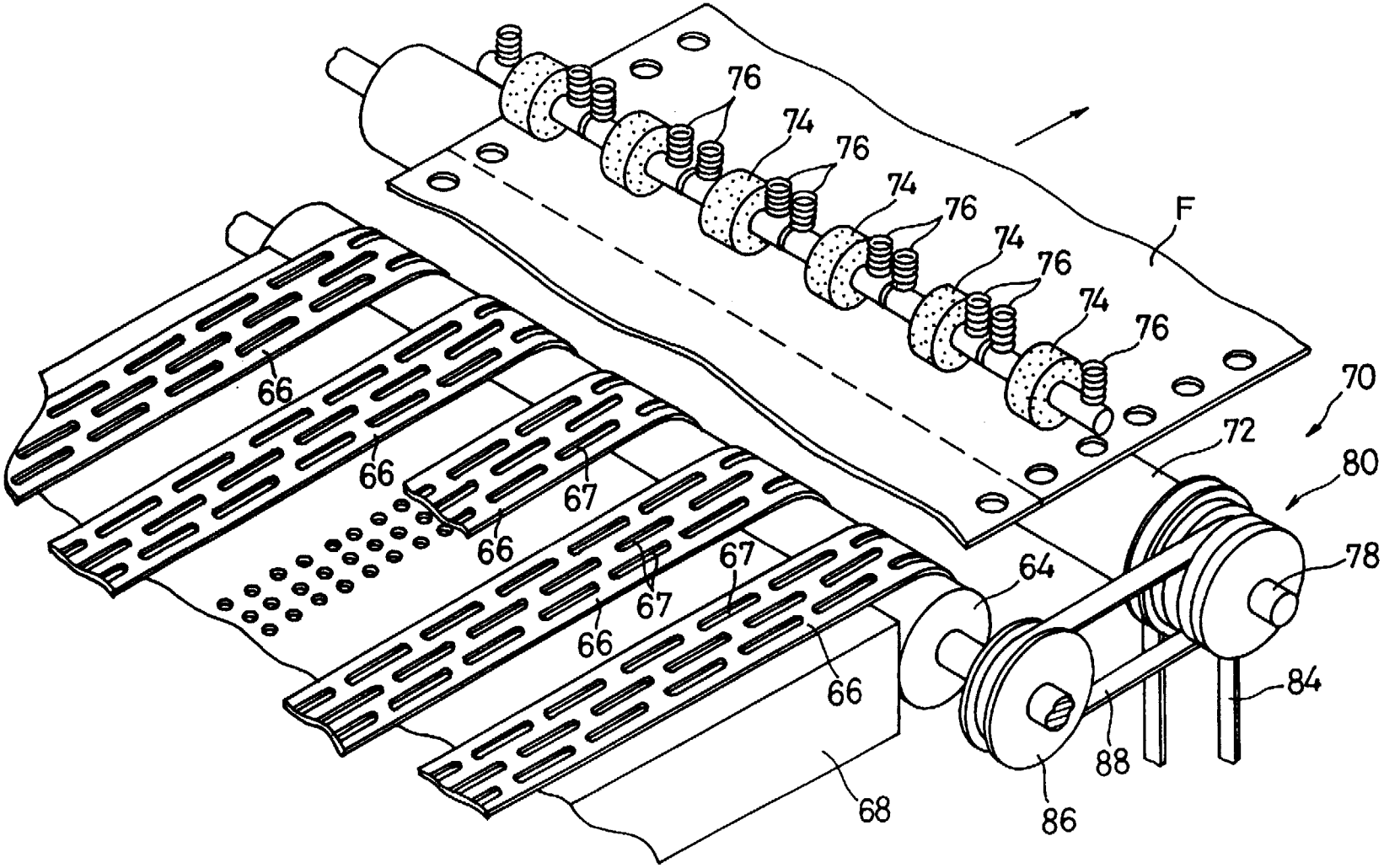
FIG. 3 is a perspective view showing a scuff roller unit disposed on the termination side of a belt conveyer of FIG. 1.

A scuff roller unit 70 is disposed on the downstream side of the belt conveyer 60, that is, between the belt conveyer 60 and the ejecting section. As shown in FIG. 3, the scuff roller unit 70 has a supporting roller 72 which is set at the same level as the roller 64 of the belt conveyer 60 and extends in parallel with the roller 64. A plurality of free rollers 74 are disposed directly above the supporting roller 72 and arranged along the supporting roller. The free rollers 74 are rotatably mounted on the roller shafts which are supported by a bracket (not shown). A plurality of compression coil springs 76 are respectively disposed between the bracket and two ends of each of the roller shafts and the compression coil springs 76 bias the corresponding roller shafts, that is, free rollers 74 towards the supporting roller 72.

A dual driving pulley 80 is mounted on the roller shaft 78 of the supporting roller 72, and one of the pulley portions of the driving pulley 80 is coupled to an output pulley of an electric motor 82 (FIG. 16) via a driving belt 84 and the other pulley portion is coupled to a pulley 86 disposed on the belt conveyer 60 side via a transmission belt 88. The pulley 86 is mounted on the roller shaft of the roller 64. Therefore, the driving force of the electric motor 82 is transmitted to the driving pulley 80 to rotate the supporting roller 72, and at the same time, the driving force is transmitted to the roller 64 of the belt conveyer via the driving pulley 80 to drive the conveyer belt 66 in the preset direction.

Since the supporting roller 72 has the same diameter as the roller 64 of the belt conveyer 60 side, the circumferential speed of the supporting roller 72 and the traveling speed or feeding speed of the conveyer belt 66 are set equal to each other.

Figure 4:
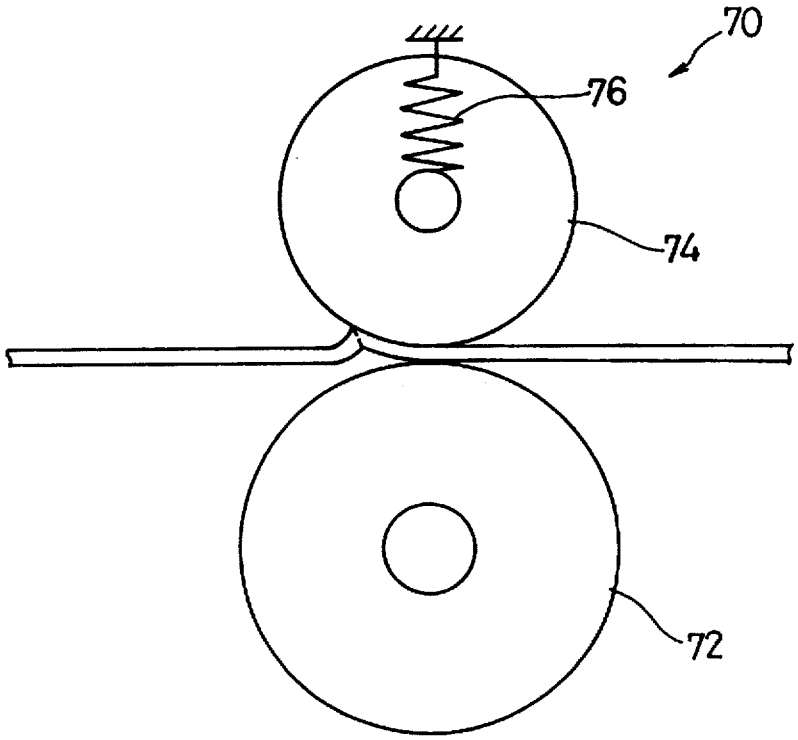
FIG. 4 is a side view schematically showing the scuff roller unit.

Even in a case where the perforation line of the fanfold paper F projects from the flat surface of the fanfold paper F as shown in FIG. 4 when the fanfold paper F pass between the belt conveyer 60 and the supporting roller of the scuff roller unit 70 and is further fed in the feeding direction, the portion of the perforation line may smoothly pass between the supporting roller 72 and the free rollers 74 because the free rollers 74 elastically press the fanfold paper against the supporting roller 72. Thus, the fanfold paper F can be fed at a constant speed irrespective of the presence of the perforation lines.

Figure 5:
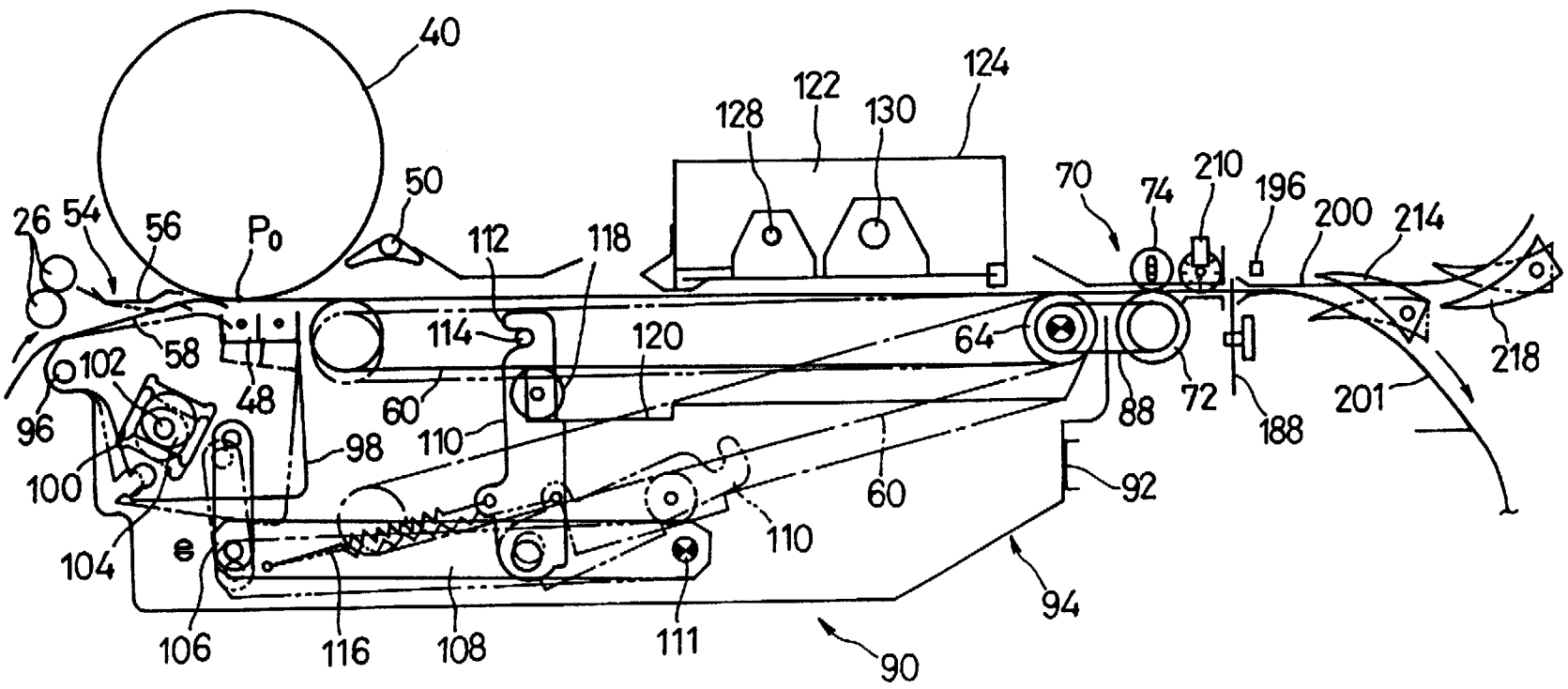
FIG. 5 is an enlarged view showing a separating device of FIG. 1.
Figure 6:
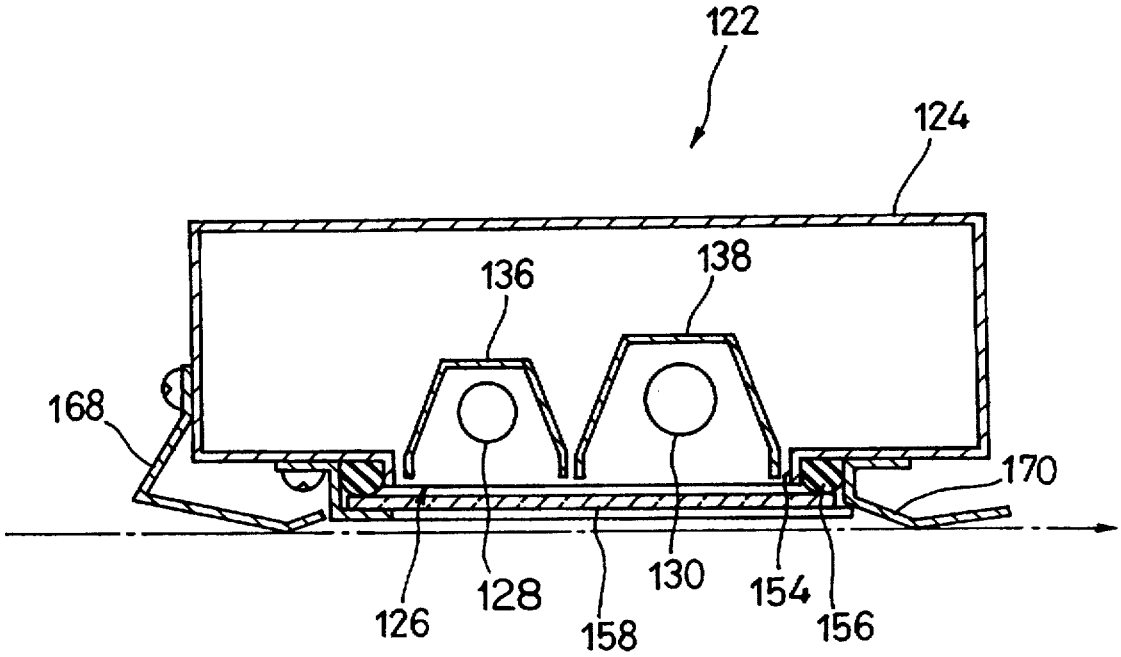
FIG. 6 is an enlarged view showing a fixing unit of FIG. 1.

The confluence guide 54, transferring/de-electrifying unit 48 and belt conveyer 60 are supported on a separating device 90 which is shown in FIG. 5. The separating device 90 has a supporting frame 92 disposed below the photosensitive drum 40. The supporting frame 92 has a pair of side plates 94 which are disposed to face each other and separated from each other in an axial direction of the photosensitive drum 40. The side plates 94 extend from the confluence guide 54 to the end of the belt conveyer 60.

A shaft 96 is provided on one of the end portions of the supporting frame 92 which lies on the upstream side with respect to the feeding direction of the printing paper. The shaft 96 is disposed to extend between the side plates 94 and rotatably mounted at both ends on the side plates 94. A pair of holder plates 98 are mounted on the shaft 96 and separately disposed to face each other in the supporting frame 92.

The confluence guide 54 and transferring/de-electrifying unit 48 are disposed between the holder plates 98 and fixed on the upper portions of the holder plates 98.

Rectangular openings 100 are formed in the central portions of the holder plates 98 and a roller shaft 102 is disposed to extend through the openings 100. Both ends of the roller shaft 102 are rotatably mounted on the side plates 94 of the supporting frame 92 and one of the ends is connected to a driving motor (not shown).

An eccentric roller 104 is mounted on the roller shaft 102 in the openings 100 and is rotatably disposed in the opening 100.

Further, short links 106 which extend downwardly are each rotatably mounted at one end on a corresponding one of the holder plates 98 near the opening 100. Long links 108 which are disposed below the belt conveyer 60 and extend towards the terminal end of the belt conveyer 60 are each rotatably coupled at one end with the lower end of a corresponding one of the short links 106. The long link 108 is rotatably mounted at the other end thereof on the corresponding side plate 94 via a shaft 111.

Supporting arms 110 are rotatably mounted at the lower end thereof on the central portions of the long links 108. The supporting arm 110 extends upwardly to the belt conveyor 60 and the upper end thereof is formed as a hook 112 which is engaged with a pin 114 projecting from the corresponding side frame of the belt conveyer 60. The long links 108 and the supporting arms 110 are connected to each other by means of extension springs 116. The extension springs 116 bias and rotate the corresponding supporting arms 110 in such a direction as to push the hooks 112 thereof towards the respective pins 114 and bias and rotate the long arms 108 in such a direction as to push one-side ends of the long arms 108 upwardly. Further, a guide roller 118 is rotatably mounted on the surface of the supporting arm 110 which lies on the belt conveyer 60 side and the guide rollers 118 can be moved along guide grooves 120. The guide grooves 120 are formed in the side frames of the belt conveyer 60 and extend in the feeding direction of the printing paper.

Therefore, as shown in FIG. 5, each of the holder plates 98 is pushed into a raised position via the short links 106 by means of the long links 108 and set in the raised position, and the confluence guide 54 and transferring/de-electrifying unit 48 are set in the operative position which is near the photosensitive drum 40. At this time, the belt conveyer 60 is supported in a horizontal position by means of the paired supporting arms 110.

If the eccentric rollers 104 are rotated in the state shown in FIG. 5, the eccentric rollers 104 push the edges of the openings 100 in the holder plates 98 downwardly as indicated by two-dot-dash lines. As a result, the paired bolder plates 98 are rotated downwardly around the shaft 96 and the confluence guide 54 and the transferring/de-electrifying unit 48 are moved downwardly and separated from the photosensitive drum 40.

The downward movement of the holder plates 98 is converted to the rotational movement of the long links 108 via the short links 106. That is, the long links 108 are rotated downwardly around the shaft 111 against the spring force of the extension springs 116. With this rotational movement, the supporting arms 110 are also pushed downwardly and the belt conveyer 60 is rotated downwardly around the roller 64 which lies on the termination side and one of the end portions thereof lying on the upstream side is separated from the photosensitive drum 40.

If the supporting arms 110 are rotated in a direction to release the engagement of the hooks 112 with the pins 114 lying on the belt conveyer 60 side, the supporting arms 110 rotate the belt conveyer 60 by a large angle via the guide roller 118 as indicated by two-dot-dash lines. As a result, the belt conveyer 60 is largely separated from the photosensitive drum 40 and occurrence of printing paper jam on the belt conveyer 60 may be easily removed.

A fixing unit 122 is disposed directly above the belt conveyer 60 and the fixing unit 122 is placed on the termination side of the belt conveyer 60. The fixing unit 122 is shown in detail in FIGS. 6 to 9. The fixing unit 122 has a box-type lamp housing 124 and an opening 126 is formed in the bottom surface of the lamp housing 124, that is, in the surface which faces the printing paper fed by the belt conveyer 60. The lamp housing 124 has a width larger than the width of the printing paper in the transverse direction of the belt conveyer 60.

A halogen lamp 128 for preheating and a flash lamp 130 made of a xenon lamp for fixing are disposed in the lamp housing 124 and arranged in this order from the upstream side in the feeding direction of the printing paper. These lamps extend in the lengthwise direction of the lamp housing 124, that is, in the transverse direction of the belt conveyer 60 and two ends thereof are supported on the lamp housing 124 via a pair of holders 132 and 134. Further, in the lamp housing 124, reflecting plates 136 and 138 are disposed above the two lamps to cover the lamps. The reflecting plates are mounted on the lamp housing 124 by use of suitable mounting means (not shown).

Figure 7:
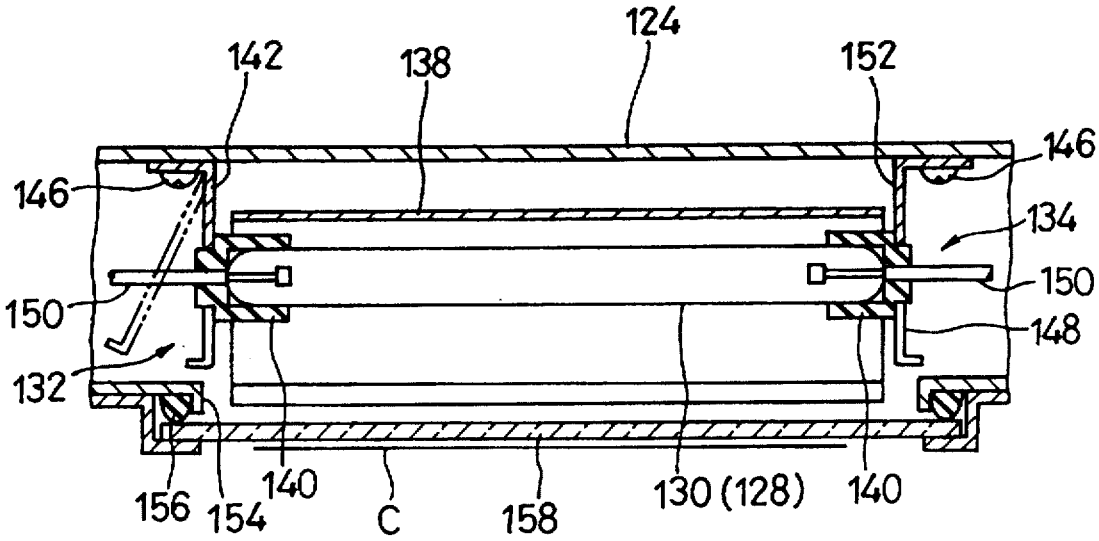
FIG. 7 is a longitudinal section of the fixing unit.
Figure 8:
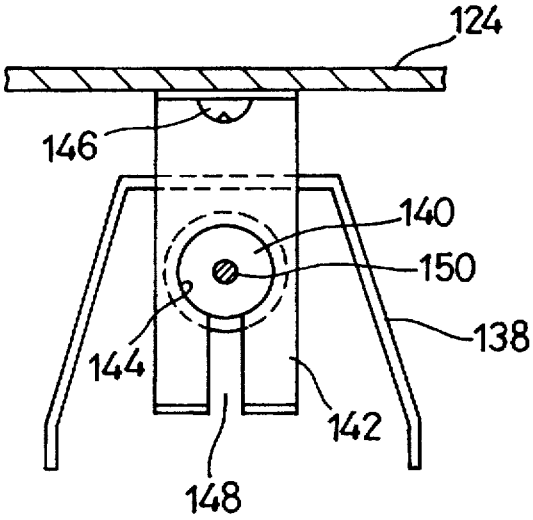
FIG. 8 is a side view of a lamp holder disposed in the fixing unit.

As shown in FIGS. 7 and 8, the holder 132 which is one of the above paired holders includes a socket 140 attached to the lamp end portion and a supporting plate 142 for suspending the lamp end via the socket 140. The socket 140 is formed in a stepped cylindrical configuration and formed of an electrically insulation material such as polyimide or ceramics which has a high heat-resisting property. A mounting hole with which the lamp end portion is engaged is formed in the large-diameter portion of the socket 140 and the small-diameter portion thereof is formed to be inserted into a holding hole 144 of the supporting plate 142. More specifically, the supporting plate 142 is formed of a rectangular leaf spring and the holding hole 144 is formed in the central portion of the supporting plate 142 as is clearly shown in FIG. 8. The upper end portion of the supporting plate 142 is bent, set in close contact with the ceiling wall and attached to the ceiling wall by use of an attaching screw. Therefore, the supporting plate 142 can be suspended from the ceiling wall of the lamp housing 124. Also, the lower end portion of the supporting plate 142 is slightly bent in the same direction as the upper end portion thereof. A slit 148 is formed in the supporting plate 142 to straightly extend from the holding hole 144 of the supporting plate to the bottom end thereof. Since a cord 150 extending from the socket 140 can be previously guided into the holding hole 144 via the slit 148 if the slit 148 is formed in the supporting plate 142, the socket or the lamp end portion can be inserted into the holding hole 144 without paying any attention to the presence of the cord.

The other holder has substantially the same construction as the holder described above, but a supporting plate 152 of the holder 134 is formed of a normal rigid metal plate instead of the leaf spring.

If both end portions of the lamp are supported by means of the paired holders 132 and 134, the lamp can be elastically supported between the holders. Therefore, particularly when the lamp is a flash lamp and even if the lamp vibrates at the time of light emission thereof, the vibration is effectively alleviated by the elastic property of the supporting plate 142 made of the leaf spring, thereby preventing a large load from being applied to the bulb of the lamp. Further, since the supporting plate 152 of the other holder has high rigidity, the vibration of the lamp Will not be amplified and can be rapidly attenuated. It is considered that the vibration of the flash lamp 130 is caused by air around the bulb which is rapidly heated and expanded at the time of light emission.

When the lower end portion of the supporting plate 142 of the former holder 132 is lifted upwardly and the supporting plate 142 is elastically deformed as indicated by two-dot-dash lines in FIG. 7, the lamp end portion can be removed from the holding hole 144 of the supporting plate 142, and as a result, the lamp can be removed from the paired holders. After this, a new lamp may be supported between the paired holders and thus the lamp can be replaced.

The opening 126 of the lamp housing 124 has a rectangular rim 154 whose internal edge portion projects downwardly and which is surrounded by a sponge member 156 formed of silicone rubber The sponge member 156 slightly projects downwardly from the rim 154.

The opening 126 is covered with a rectangular transparent glass plate 158 from the bottom side and the peripheral portion of the glass plate 158 is pressed against and fixed on the bottom surface of the lamp housing 124 via the sponge member 156 by means of a plurality of fittings. The glass plate 158 is used to protect the halogen lamp 128 and flash lamp 130 on one hand and prevent toners and dusts from being attached to the lamps on the other.

Figure 9:
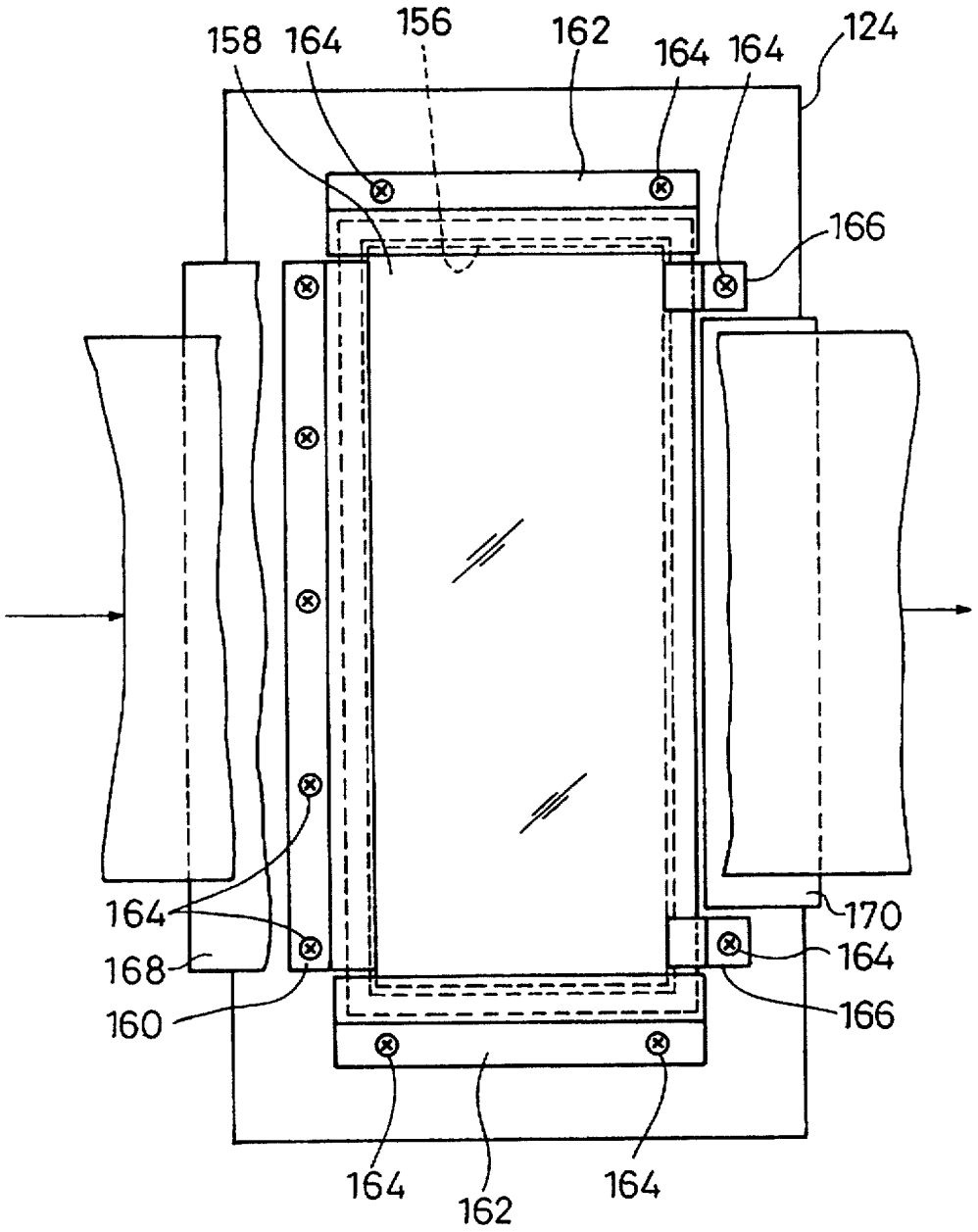
FIG. 9 is a bottom view of the fixing unit.

As is more clearly understood from FIG. 9, the above fitting includes a cross metal fitting 160 and a pair of side metal fitting 162. The cross metal fitting 160 is formed of a plate disposed to extend along one of the end sides of the glass plate 158 which lies on the upstream side with respect to the feeding direction of the printing paper and having a stepped portion in the feeding direction. The cross metal fitting 160 is fixed on the bottom surface of the lamp housing 124 by means of a plurality of fitting screws 164 so as to hold the one-side end portion of the glass plate 158 between the bottom surface of the lamp housing 124 and the stepped portion of the cross metal fitting via the sponge member 156.

The paired side metal fitting 162 are disposed to respectively extend along both sides of the glass plate 158 which are set parallel to the feeding direction of the printing paper. The side metal fitting 162 have substantially the same structure as the cross metal fitting 160 and are fixed on the bottom surface of the lamp housing 124 by means of a plurality of fitting screws 164 so as to hold corresponding one-side edge portions of the glass plate 158 between the bottom surface of the lamp housing 124 and the stepped portion of the side metal fitting via the sponge member 156.

A pair of auxiliary metal fittings 166 are disposed on both sides of the remaining side end portion of the glass plate 158. The auxiliary metal fittings 166 are sufficiently smaller than the cross metal fitting 160 and side metal fitting 162, but have substantially the same cross sections as the latter metal fittings. Therefore, the remaining side end portion of the glass plate 158 is also held between the bottom surface of the lamp housing 124 and the paired auxiliary metal fittings 166 via the sponge member 156.

The paired auxiliary metal fittings 166 are separately disposed from each other with a distance sufficiently larger than the width of the printing paper, and therefore, when the printing paper is fed directly below the fixing unit 122 by the belt conveyer 60, the front end of the printing paper may freely pass through between the paired auxiliary metal fittings 166.

A paper guide 168 is attached to the end face of the lamp housing 124 which lies on the cross metal fitting side and the lower end portion of the paper guide 168 is formed to extend along the belt conveyer 60 and towards the downstream side of the belt conveyer 60 so as to be continuous with the lower end portion of the cross metal fitting 160. Therefore, when the printing paper has reached the fixing unit 122, the front end portion thereof is guided by the paper guide 168 and stably fed below the glass plate 158 and the front end portion of the printing paper will not be caught by the cross metal fitting 160.

Another paper guide 170 is attached to the bottom surface of the lamp housing 124 on the auxiliary metal fitting side and the paper guide 170 is formed to extend along the belt conveyer 60 towards the downstream side of the belt conveyer 60. Therefore, after the front end of the printing paper has passed below the glass plate of the fixing unit 122, the paper guide 170 guides the front end of the printing paper and ejects the front end to the exterior of the fixing unit 122 without fail.

Although not shown in the drawing, the fixing unit 122 has cooling means for supplying cool air into the lamp housing 124 so as to prevent the halogen lamp 128 and flash lamp 130 from being overheated.

Figure 10:
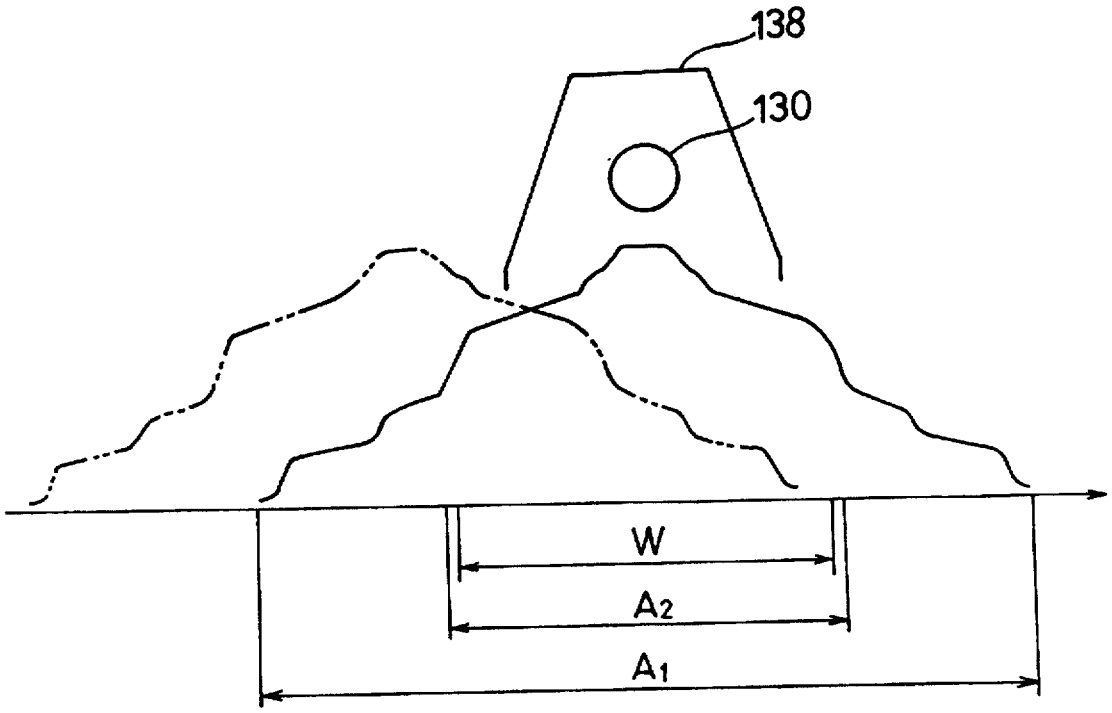
FIG. 10 is a diagram showing the distribution of light energy applied to the printing paper from a flash lamp of the fang unit when light is emitted from the flash lamp.

FIG. 10 shows the distribution of light energy applied to the printing paper in the feeding direction of the printing paper when flash light is emitted once from the flash lamp 130. As is clearly understood from the distribution, in an illumination area A1 of the flash light on the printing paper, 70 to 80% of the total light energy is concentrated on an area A2 which is the central portion of the area A1 and occupies 50% of the area A1. The above light energy distribution is obtained by adequately selecting the shapes of the reflecting plates 136 and 138. However, it is impossible to apply light energy which is uniform in the entire portion of the illumination area A1 only by use of the reflecting plates.

Therefore, in order to apply uniform light energy on the entire printing area of the printing paper to be fed, it is necessary to repeatedly apply flash light to the printing surface by taking the triggering frequency of the flash lamp and the feeding speed of the printing paper into consideration.

In this case, if the feeding speed of the printing paper is v, the triggering frequency of the flash lamp is f, an area on which light energy of sufficiently large amount for fixing the toner image is applied in the illumination area A1 is W, and the number of flash light emitting operations is n, then the values of v, f and n are determined to satisfy the following equation.

$$v/f=n\cdot W$$

Figure 11:
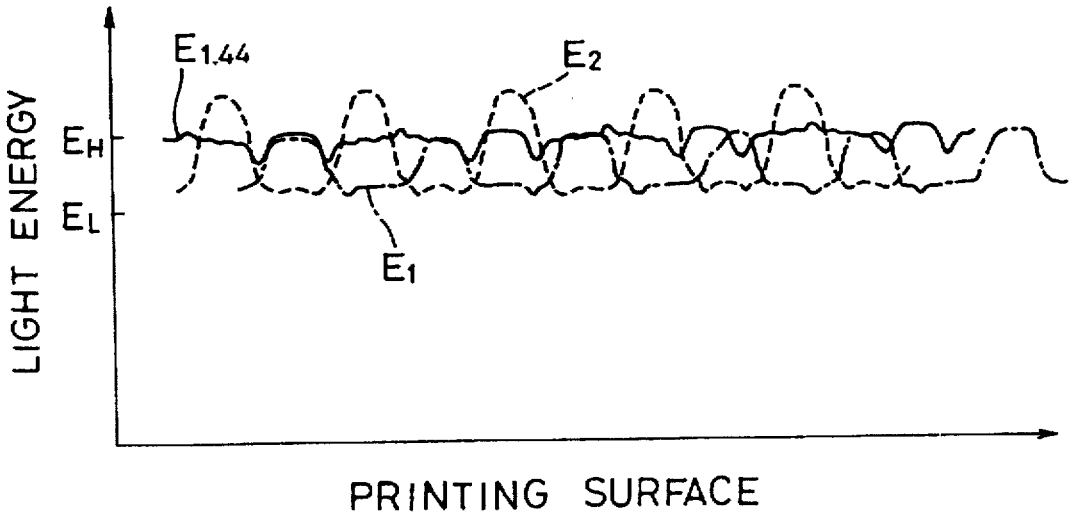
FIG. 11 is a diagram showing the distribution of light energy applied to the printing paper when light is repeatedly emitted from the flash lamp.

In general, the number n of light emitting operations is set to a natural number of 1 or 2, and when the number n of light emitting operations is set to 2, light energy applied to the printing surface has a distribution characteristic E2 shown by broken lines in FIG. 11. However, as is clearly seen from the distribution characteristic E2, the light energy applied to the printing surface significantly varies in the feeding direction of the printing paper. Therefore, when the above distribution characteristic is used, the output of the flash lamp is adjusted to set the level of light energy necessary for fixing to EL or EH. In the former case, in an area of high energy, toners on the printing surface explosively boil to deteriorate the quality of fixation or contaminate the printing paper and peripheral members with gas generated by decomposition of the toners. In the latter case, the fixing strength of toners is weak and the toners tend to be removed from the printing surface.

The distribution characteristic E1 of light energy obtained in a case where the number n of light emitting operations is set to 1 is indicated by one-dot-dash lines in FIG. 11. Variation in the light energy of the distribution characteristic E1 is smaller than that of the distribution characteristic E2, but even in this case, the above problems cannot be solved.

With the above condition taken into consideration, in this embodiment, the number n of light emitting operations is set to a value within a range of 1.2 to 1.8, and preferably, 1.3 to 1.7. For example, the distribution characteristic E1.44 of light energy obtained when the number n of light emitting operations is set 1.44 is indicated by a solid line in FIG. 11. As is clearly seen from the distribution characteristic E1.44, variation in the light energy is significantly suppressed in comparison with the cases of the distribution characteristics E1 and E2, and as a result, substantially uniform light energy can be applied to the entire area of the printing surface to be fed.

As is schematically shown in FIGS. 1 and 5, a cutting device 172 is disposed near the ejecting section 10 on the downstream side of the belt conveyer 60, and thus, the scuff roller unit 70 is placed between the cutting device 172 and the belt conveyer 60.

Figure 12:
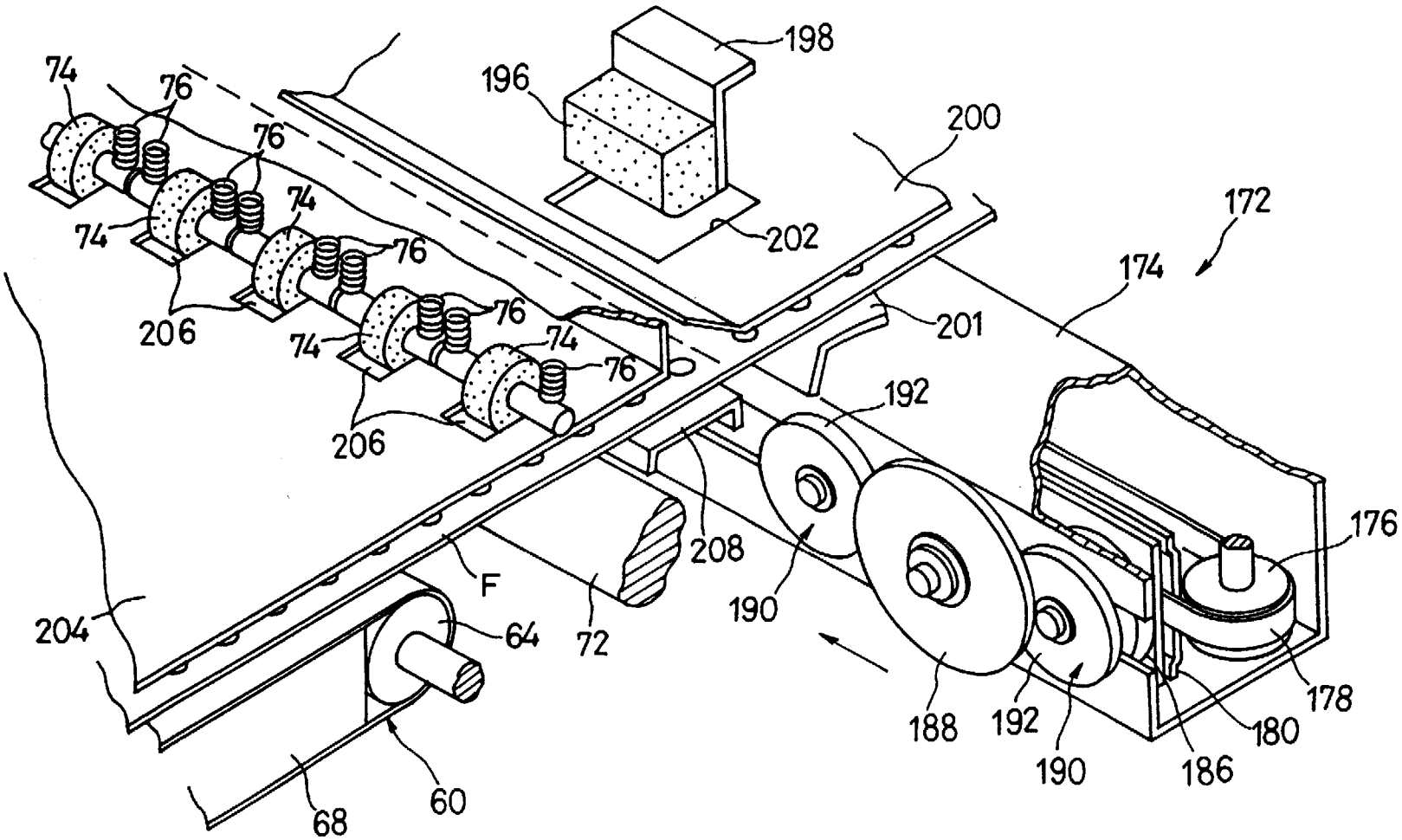
FIG. 12 is a perspective view of a cutting device of FIG. 1 with partly cut-away portion.
Figure 13:
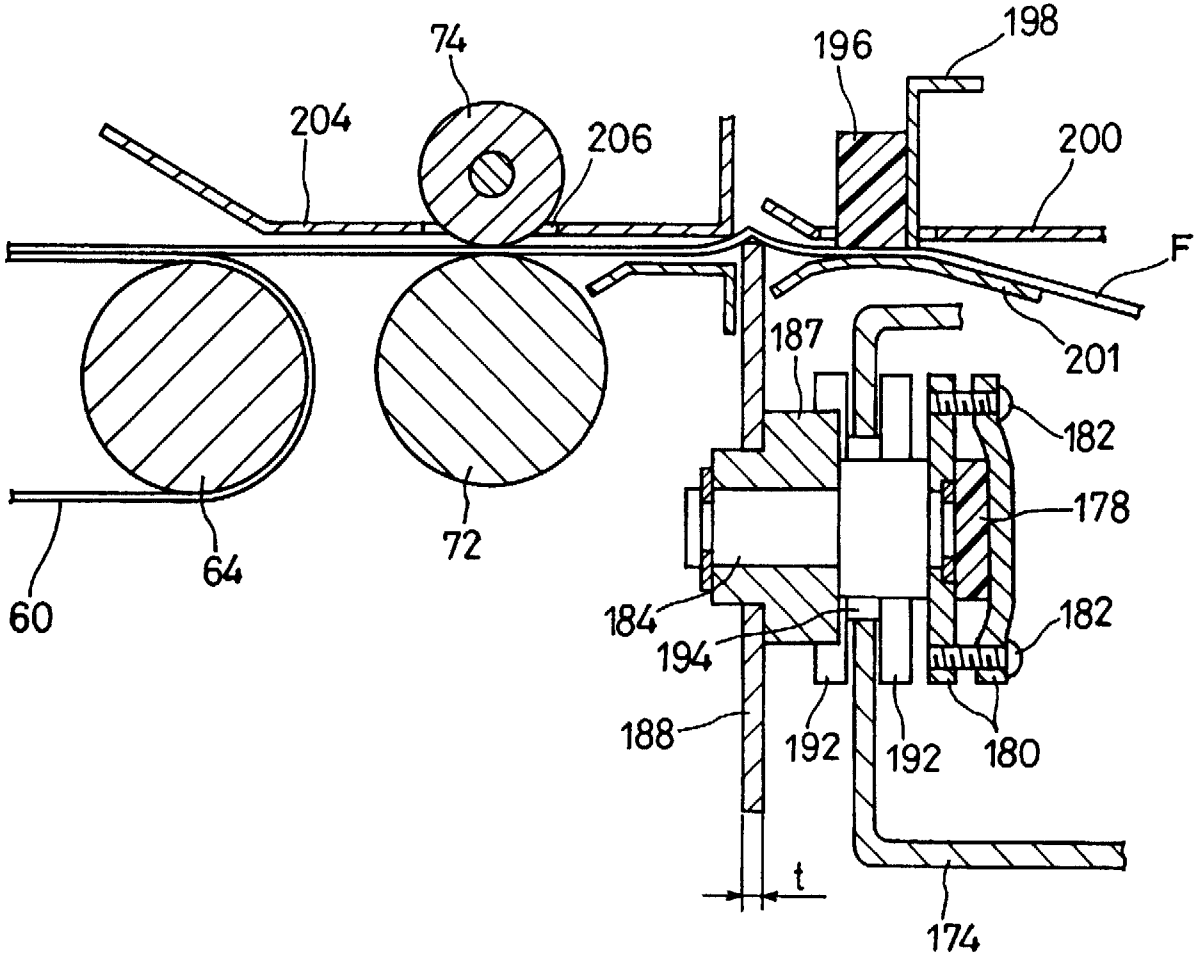
FIG. 13 is a cross sectional view showing the cutting device in the operative state.

The cutting device 172 is shown in detail in FIGS. 12 and 13. The cutting device 172 has a hollow box-type beam 174 which is disposed on the supporting roller 72 side of the scuff roller unit 70, that is, below the feeding path of the printing paper and horizontally extends in a transverse direction of the feeding path. Two end portions of the beam 174 project outwardly from the feeding path and a pair of pulleys 176 (only one of which is shown in the drawing) are horizontally arranged in the two end portions of the beam. The shafts of the pulleys 176 extend upwardly and are rotatably supported on the beam 174, and the shaft of one of the pulleys further projects from the beam 174 and is coupled to a driving source. A driving belt 178 is stretched over the paired pulleys 176 and the driving belt 178 can be reciprocally moved by forward and reverse rotations of the driving pulley 176.

As shown in FIG. 13, part of the driving belt 178 which lies on the side of the scuff roller unit 70 is held between a pair of pinch plates 180 which are formed to extend along the driving belt 178 and are connected to each other by use of a plurality of connection bolts 182. A cutter shaft 184 horizontally projects from the outside pinch plate, that is, one of the pinch plates which lies on the side of the scuff roller unit 70. The proximal end of the cutter shaft 184 is supported on the central portion of the outside pinch plate 180 and the distal end thereof projects to the exterior of the beam 174 through a guide slot 186 of the beam 174. The guide slot 186 is formed in the side wall of the beam 174 and extends in the lengthwise direction of the beam 174.

A cutter disk 188 is rotatably attached to the distal end of the cutter shaft 184 via a holder sleeve 187. The cutter disk 188 has such a diameter as to slightly project upwardly from the feeding path of the printing paper and a constant thickness t which is adequately determined to break the perforation line of the fanfold paper F.

Further, a pair of guide wheels 190 are disposed on both sides of the cutter disk 188 in the lengthwise direction of the beam 174. Each of the guide wheels 190 has a pair of pinch disks 192 sandwiching the side wall of the beam 174 and a wheel section 194 which connects the pinch disks 192 to each other and is disposed to freely slide along the guide slot 186. Although not shown in the drawing, a wheel shaft projects from the pinch disk 192 which is disposed inside in the beam 174. Like the cutter shaft 184, the wheel shaft is supported on the outside pinch plate 180.

Therefore, when the driving belt 178 is driven, the cutter disk 188 reciprocally moves along the side wall of the beam 174. Since, at this time, each of the guide wheels 190 is moved with the side wall of the beam 174 held between the paired pinch disks 192 and the wheel section 194 guided by the guide slot 186 in the side wall, the orientation of the cutter disk 188 can be kept unchanged.

A plurality of holding pads 196 are disposed above the beam 174 and arranged at a regular interval along the lengthwise direction of the beam 174. In FIG. 12, only one holding pad 196 is shown.

Each of the holding pads 196 is formed of rubber in a cubic form and connected to a lifting/lowering means (not shown) via a holder plate 198. A pair of guide plates 200 and 201 are arranged between the holding pads 196 and the beam 174 with the feeding path of the printing paper disposed therebetween in the vertical direction and openings 202 are formed in the guide plate 200 which is the upper one of the above paired guide plates in position corresponding to the holding pads 196. The opening 202 has a size such that the holding pad 196 can be inserted therein.

The upper and lower guide plates 200 and 201 are formed to extend from the printing section 8 into the ejecting section 10, and the upper guide plate 200 is bent upwardly in the ejecting section 10 and the lower guide plate 201 is bent downwardly in the ejecting section (refer to FIG. 5).

Another upper guide plate 204 is disposed above the belt conveyer 60 on the upstream side of the guide plate 200 and the upper guide plate 204 is formed to extend from the terminal end of the belt conveyer 60 and over the scuff roller unit 70. Therefore, openings 206 are formed in the upper guide plate 204 in positions corresponding to the free rollers 74 of the scuff roller unit 70 and thus the free rollers 74 are respectively set in contact with the supporting rollers 72 via the corresponding openings 206. Further, a lower guide plate 208 is disposed below the feeding path between the scuff roller unit 70 and the cutting device 172.

A preset gap is provided between the lower guide plates 208 and 201 to permit the movement of the cutter disk 188. As is schematically shown in FIGS. 1 and 5, a detector 210 for detecting passage of the printing paper is disposed between the scuff roller unit 70 and the cutting device 172.

Figure 14:
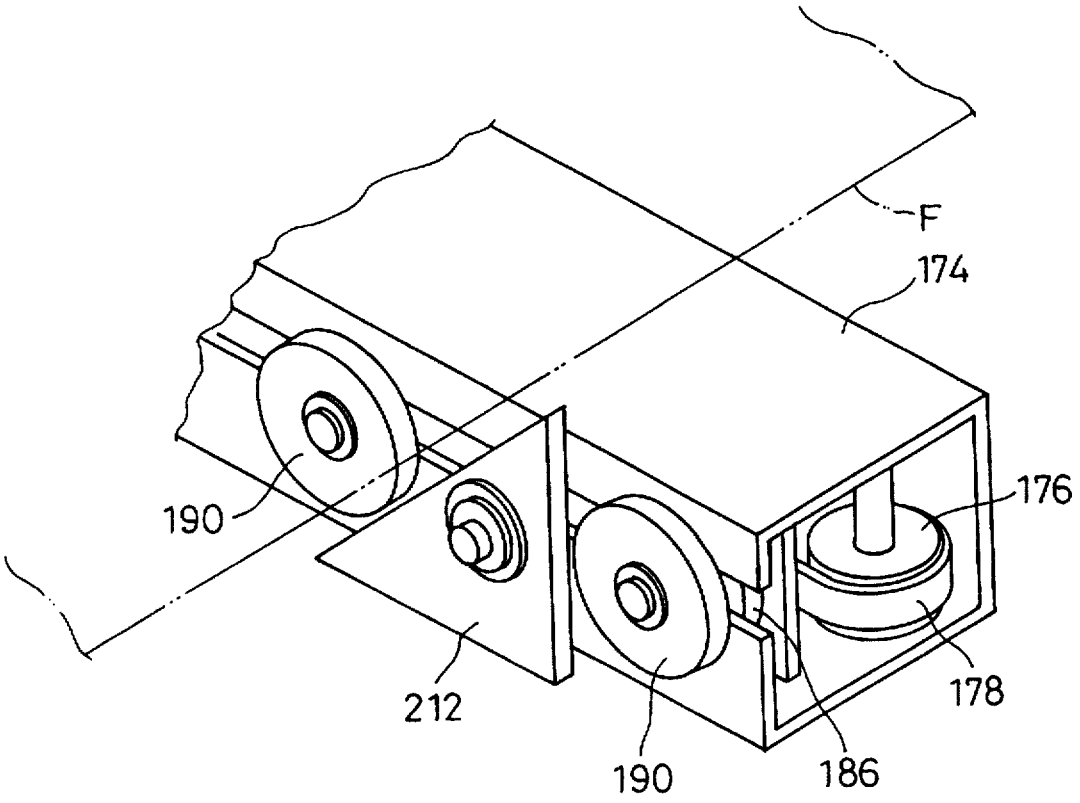
FIG. 14 is a perspective view of a cutting device according to another embodiment.

The cutting device 172 may use a triangular plate 212 as shown in FIG. 14 instead of the cutter disk 188.

Figure 15:
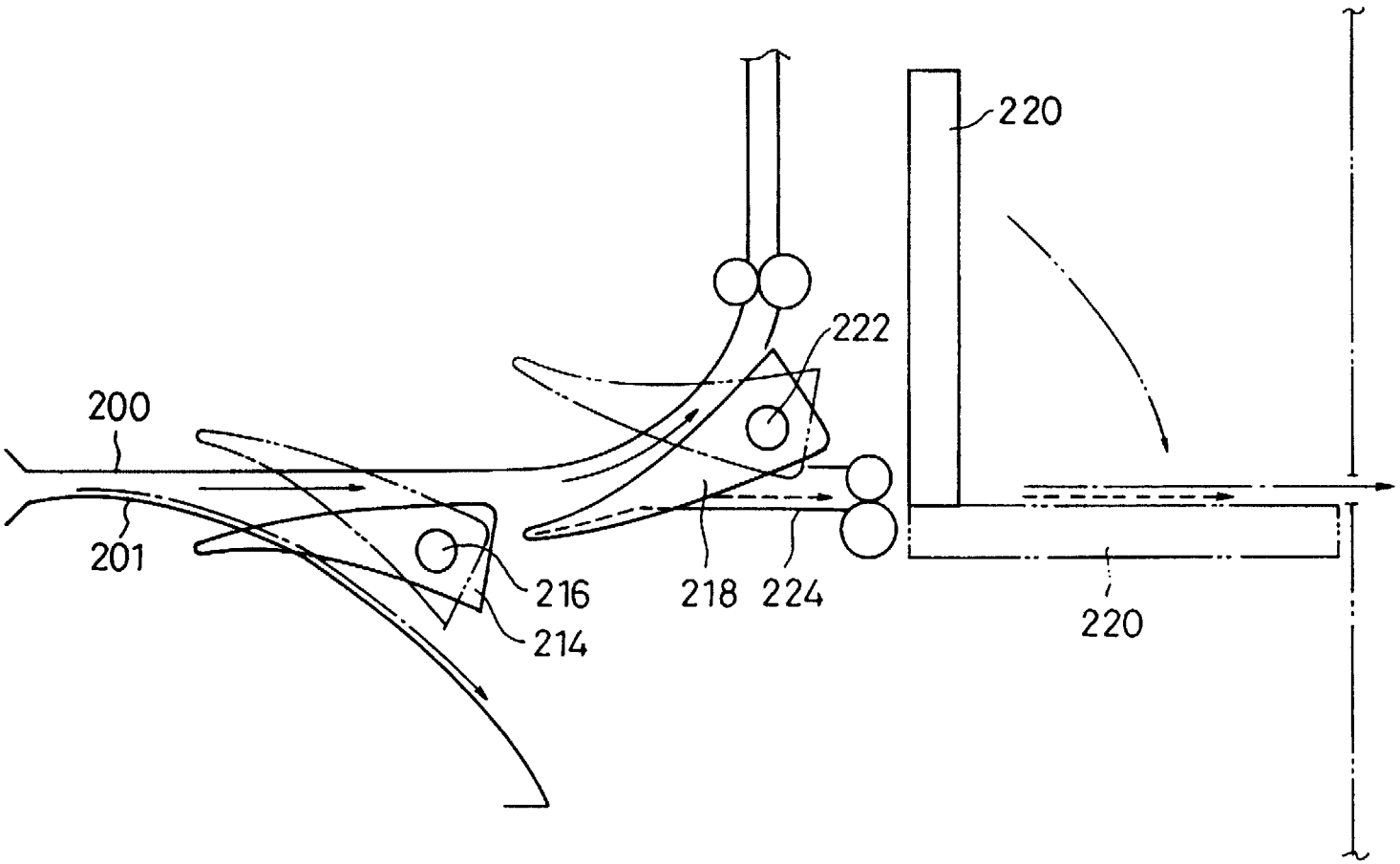
FIG. 15 is an enlarged view showing part of an ejecting section of FIG. 1.

As shown in FIG. 15, a first ejection gate 214 is disposed between the upper guide plate 200 and the lower guide plate 201 in the ejecting section 10. The first ejection gate 214 can be rotated around a supporting shaft 216 according to whether the printing paper to be fed is cut paper C or fanfold paper F.

Further, a second ejection gate 218 and a paper ejecting tray 220 are sequentially arranged on the downstream side of the first ejection gate 214. The second ejection gate 218 is also mounted to rotate around a supporting shaft 222 and the paper ejecting tray 220 is mounted to rotate around a supporting shaft (not shown).

As shown in FIG. 1, the upper guide plate 200 is connected to an ejecting path for the cut sheet C and the ejecting path extends upwardly and is bent towards the belt conveyer 60 so as to be open to the upper surface of the electrophotographic apparatus.

Assuming that cut sheet C is used as the printing paper, then the first and second ejection gates 214 and 218 are rotated downwardly and set to the respective lowered positions as indicated by solid lines in FIG. 15. In this case, the distal end portion of the first ejection gate 214 crosses the lower guide plate 201 to close the path extending along the lower guide plate 201 and open a path extending along the upper guide plate 200. Also, the second ejection gate 218 opens the path extending along the upper guide plate 200. In this condition, the cut sheet C fed from the belt conveyer 60 is guided by the first and second ejection gates 214 and 218 along the upper guide plate 200 and fed in the upward direction as shown by arrows of solid lines in FIG. 15. After this, the cut sheet C is fed along the ejecting path and ejected towards the upper surface of the apparatus. In this case, the cut sheet C is ejected from the apparatus to the exterior with the printed surface facing down, that is, in the so-called face-down state.

When the paper ejecting tray 220 is rotated downwardly from the vertical position indicated by a solid line of FIG. 15 and set to a horizontal position indicated by two-dot-dash lines, the second ejection gate 218 is rotated around the supporting shaft 222 upwardly from the lowered position indicated by the solid line in connection with the paper ejection tray 220 and set to the raised position indicated by two-dot-dash lines. At this time, since the distal end of the second ejection gate 218 crosses the upper guide plate 200 to close the path extending along the upper guide plate 200, the cut sheet C is fed through between the upper guide plate 200 and the first ejection gate 214, then straightforwardly fed to the paper ejecting tray 220 as indicated by an arrow of broken lines and received onto the paper ejecting tray 220. In order to correctly guide the cut sheet C towards the paper ejecting tray 220, an auxiliary guide plate 224 is disposed between the first ejection gate 216 and the paper ejecting tray 220. In this case, the cut sheet C is ejected onto the paper ejecting tray 220 with the printed surface facing up, that is, in the so-called face-up state.

When fanfold paper F is used as the printing paper, the first ejecting gate 214 is rotated from the lowered position indicated by the solid line to the raised position. In the raised position, the distal end of the first ejection gate 214 crosses the upper guide plate 200 to close the path extending along the upper guide plate 200 and open the path extending along the lower guide plate 201. Therefore, the fanfold paper F fed is guided along the lower guide plate 201 and fed downwardly as indicated by an arrow of one-dot-dash lines.

Even when the first ejection gate 214 is set in the lowered position, the fanfold paper F passes on the paper ejecting tray 220 and can be ejected from an ejecting port of the electrophotographic apparatus if the second ejection gate 218 is set in the raised position. In this case, if a succeeding stage processing device is connected to the ejecting port of the apparatus, the printed fanfold paper F may be continuously supplied from the apparatus to the processing device.

A paper ejecting stacker 226 is disposed in the lower portion of the ejecting section 10. The fanfold paper F guided along the lower guide plate is sequentially folded along the perforation lines and stacked on the paper ejecting stacker 226. In order to fold the fanfold paper F without fail, a flat belt 228 and a chain belt 230 are disposed to face each other between the paper ejecting stacker 226 and the lower guide plate 201. A plurality of claws 232 are disposed at a regular interval and project from the flat belt 228. Therefore, when the fanfold paper F passes through between the flat belt and the chain belts while the flat belt 228 and the chain belts 230 are being driven in a preset direction, the claws 232 of the flat belt 228 and the chain belt 230 cooperate with each other to sequentially fold the fanfold paper F at each perforation line.

The paper ejecting stacker 226 can be lowered according to the height of the stack of the fanfold paper F.

Next, the printing process for the printing paper is explained.

Figure 16:
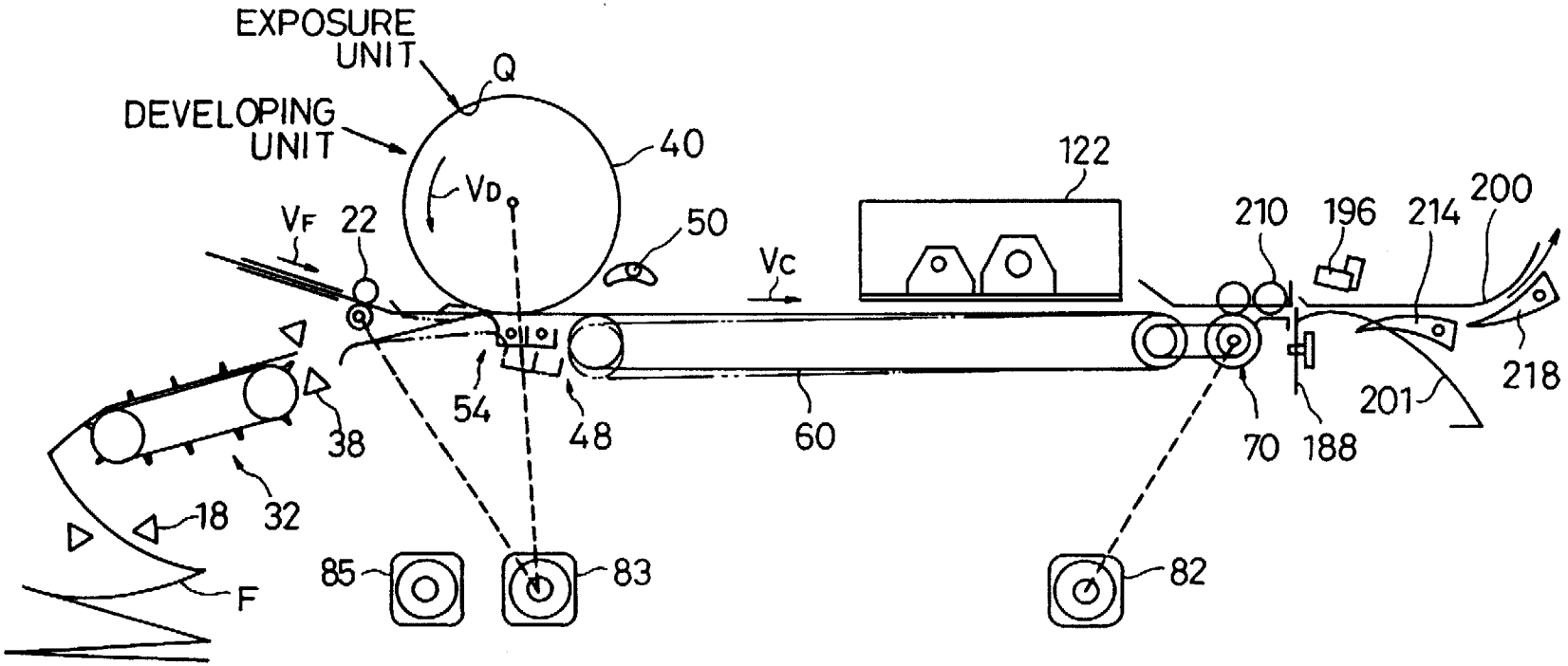
FIG. 16 shows a state in which the printing process for cut sheet is started in the apparatus.

When a selection signal for cut sheet C is supplied from a host computer or a manual switch of the electrophotographic apparatus to a control circuit (not shown) of the apparatus, the paired feed rollers 22, photosensitive drum 40, belt conveyer 60 and scuff roller unit 70 of the printing section 8 are driven. At this time, the circumference speed VF of the feed rollers 22 and the feeding speed VC0 of the belt conveyer 60 and scuff roller unit 70 are controlled to the same speed as the circumferential speed VD of the photosensitive drum 40 as shown in FIG. 16. That is, the above speeds are set to satisfy the relation expressed by the following equation.

$$VD=VF=VC0$$

As shown in FIG. 16, the feed roller 22 and photosensitive drum 40 are rotated by means of the same electric motor 83 and the suction device 68 is driven at the same time that the belt conveyer 60 is driven.

At this time, the separation device 90 is set in the raised operative state in which the confluence guide 54, the transferring/de-electrifying unit 48 and the belt conveyer 60 are set in the operative position, that is, they are pushed upwardly to the printing position, and the fanfold paper F is set in a state in which the front end thereof is pushed back to the tractor unit 32. Further, in the ejecting section 10, the first ejection gate 214 is set in the lowered position and the second ejection gate 218 is set in either the lowered position or the raised position.

When a printing starting signal is supplied from the host computer, the take-out roller 14 and the separation rollers 20 are rotated to take out one sheet of cut paper C from the tray 12 in the stacking section 2. The register-correction is effected for the cut sheet C by the register rollers 26 and the cut sheet C is fed from the register rollers 26 into the introducing guides 28 at a constant speed. The cut sheet C fed into the introducing guides 28 is further fed through the confluence guide 54 by means of the feed rollers 22 and then supplied to the transferring position P0 of the photosensitive drum 40. In this case, the register rollers 26 are rotated at the same circumferential speed as the feed rollers 22.

When the cut sheet C is fed in the introducing guides 28 and the front end of the cut sheet C has reached the end sensor 30, the end sensor 30 detects the passage of the front end of the cut sheet C and outputs a detection signal.

Figure 17:
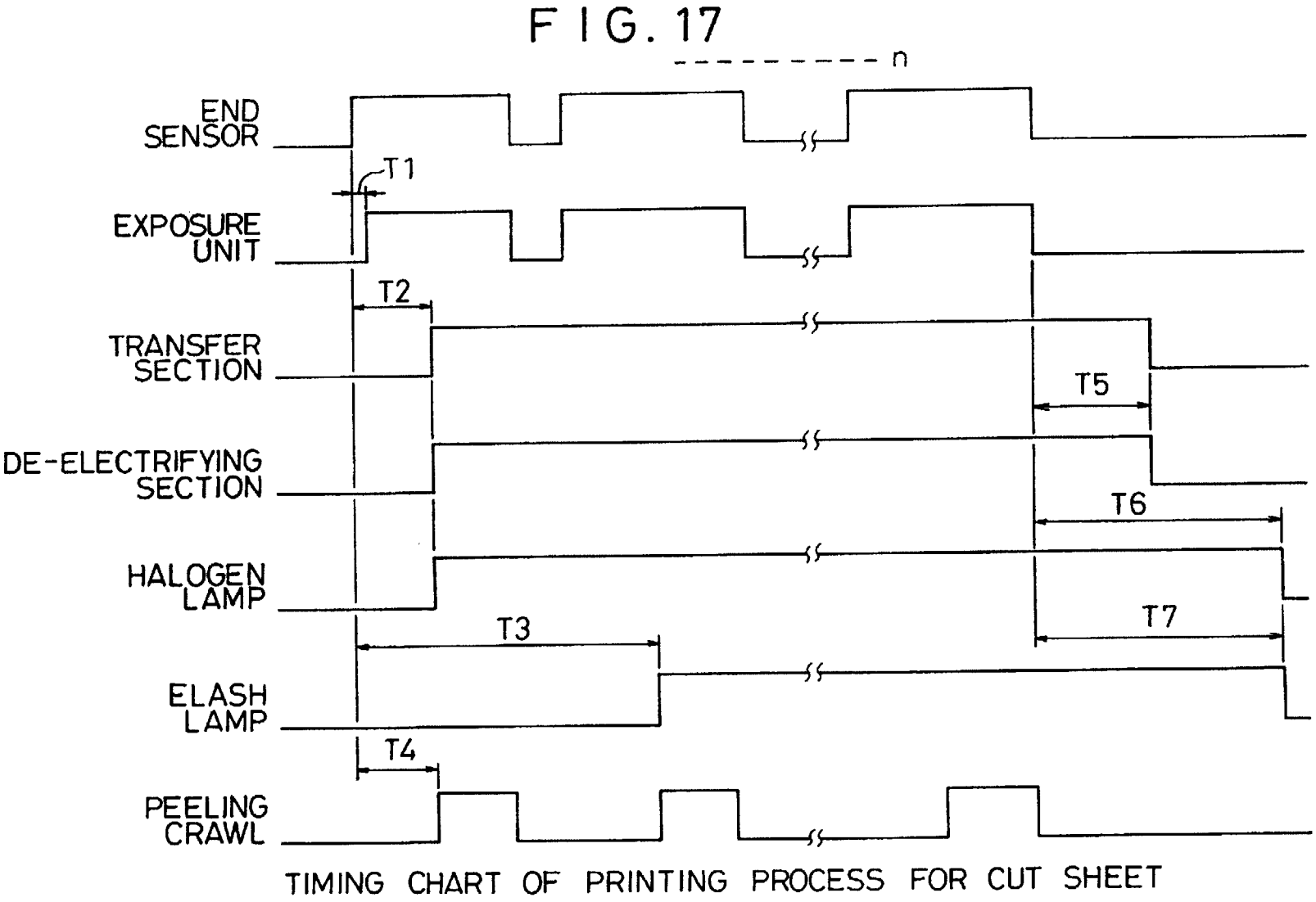
FIG. 17 is a timing chart showing the operation effected in the printing mode for cut sheet.

As shown in FIG. 17, when time T1 has passed after the output time of the detection signal which is set as reference time, the exposure unit 44 forms an electrostatic latent image on the photosensitive surface of the drum 40 according to image data supplied from the host computer.

The transferring/de-electrifying unit 48 and the halogen lamp 128 of the fixing unit 122 are operated when time T2 (T2>T1) has passed after the output time of the detection signal. The time T2 is set to a period of time required for the front end of the cut sheet C to reach the transferring position of the photosensitive drum 40 after the detection signal has been output.

Further, the flash lamp 130 of the fixing unit 122 is repeatedly operated to intermittently emit light when time T3 (T3>T2) has passed after the output time of the detection signal. The time T3 is set to a period of time required for the front end of the cut sheet C to reach a position directly below the flash lamp 130 of the fixing unit 122 after the detection signal has been output.

If the time T1 is adequately set, the electrostatic latent image which is formed on the photosensitive surface of the drum 40 in an exposing position Q in FIG. 16 is fed with rotation of the photosensitive drum 40 and then developed into a toner image by the developing unit 46. After this, when the toner image reaches the transferring position P0 of the photosensitive drum 40, the front end of the cut sheet C also reaches the transferring position P0. Then, the toner image on the photosensitive drum 40 is transferred to the cut sheet C in the transferring position P0 by the transfer section 48a of the transferring/de-electrifying unit 48.

After transfer of the toner image, charges on the cut sheet C are removed by the de-electrifying section 48b of the transferring/de-electrifying unit 48 for peeling the cut sheet C from the photosensitive drum 40.

Further, when time T4 (time T4 is slightly longer than time T2) has passed after the detection signal is output from the end sensor 30, the peeling claw 50 is operated for a preset period of time and then brought into contact with the photosensitive drum 40. Thus, the peeling claw 50 prevents the cut sheet C from being wound on the photosensitive drum 40 when the front end of the cut sheet C passes the photosensitive drum 40.

When the rear end of the cut sheet C passes through between the feed rollers 22, the front end thereof reaches a position on the belt conveyer 60. Therefore, the feeding operation of the cut sheet C is now effected by the belt conveyer 60 and the cut sheet C is fed while being attached to the conveyer belt 66 by suction force.

When the cut sheet C having a toner image transferred thereon is fed on the conveyer belt 66 and passes directly below the fixing unit 122, the toners forming the toner image on the cut sheet C are previously heated by the halogen lamp 128, applied with flash light from the flash lamp 130 and then melt to be fixed on the cut sheet C.

Since the number of emission times of flash light is determined as described before, uniform light energy of adequate amount is applied to the printing surface of the cut sheet C. Therefore, fixation of the toner image on the printing paper can be effected with high reliability, generation of gas caused by decomposition of the toners can be suppressed and contamination of the cut sheet C and the peripheral members by the gas can be prevented.

One of the end portions of the glass plate 158 of the fixing unit 122 which lies on the downstream side in the feeding direction of the printing paper is fixed by use of the paired auxiliary metal fitting 166 as described before and the auxiliary metal fitting 166 are set in position apart from the feeding area of the printing paper. Therefore, when the printing paper passes a position directly below the fixing unit 122, the front end of the cut paper C will not be caught by the fixing unit 122.

In this embodiment, since time at which the detection signal is output from the end sensor 30 is set as a reference timing and light emission of the flash lamp is started when the front end of the cut sheet C has reached a position directly below the flash lamp 130, the flash lamp 130 can be prevented from wastefully emitting light and the service life of the lamp can be extended.

After the cut sheet C has been fed to the fixing unit 122 and subjected to the fixing process, the cut sheet C is fed from the belt conveyer 60 to the ejecting section 10 via the scuff roller unit 70 which are operated in synchronism with the belt conveyer 60 and the cutting device 172. At this time, the cutter disk 188 of the cutting device 172 is set in the standby position separated from the feeding path of the printing paper as shown in FIG. 12. Therefore, the cutter disk 188 will not obstruct the passage of the cut sheet C.

In the ejecting section 10, whether the ejection state of the cut sheet C is set to the face-up state or face-down state is determined according to the position of the second ejection gate 218 and then the cut sheet C is ejected onto the paper ejecting tray 220 or to the exterior of the electrophotographic apparatus.

When the rear end of the cut sheet C has passed the end sensor 30, generation of the detection signal from the end sensor 30 is stopped, and when the front end of a new cut sheet C passes the end sensor 30, a detection signal is output again. That is, the end sensor 30 repeatedly outputs a detection signal each time the cut sheet C is taken out from the tray 12.

The exposure unit 44 intermittently receives image data for one sheet of cut paper C from the host computer. Therefore, the exposure unit 44 intermittently effects the writing operation of an electrostatic latent image on the photosensitive drum 40 according to supply of the cut sheet C as shown in FIG. 17.

The transferring/de-electrifying unit 48 and the halogen lamp 128 of the fixing unit 122 are kept in the operative state until the last cut paper C to be printed has passed therethrough. That is, when the image writing operation effected by the exposure unit 44 for the last cut sheet C is completed, the time of termination of the image writing operation is set as a reference timing, the operation of the transferring/de-electrifying unit 48 is interrupted when time T5 has passed after the time of termination, and the operations of the halogen lamp 128 and flash lamp 130 of the fixing unit 122 are sequentially interrupted when time T6 and time T7, which is slightly longer than the time T6, have passed after the time of termination, respectively.

Next, the printing process of fanfold paper F is explained with reference to FIGS. 18 and 19.

Figure 18:
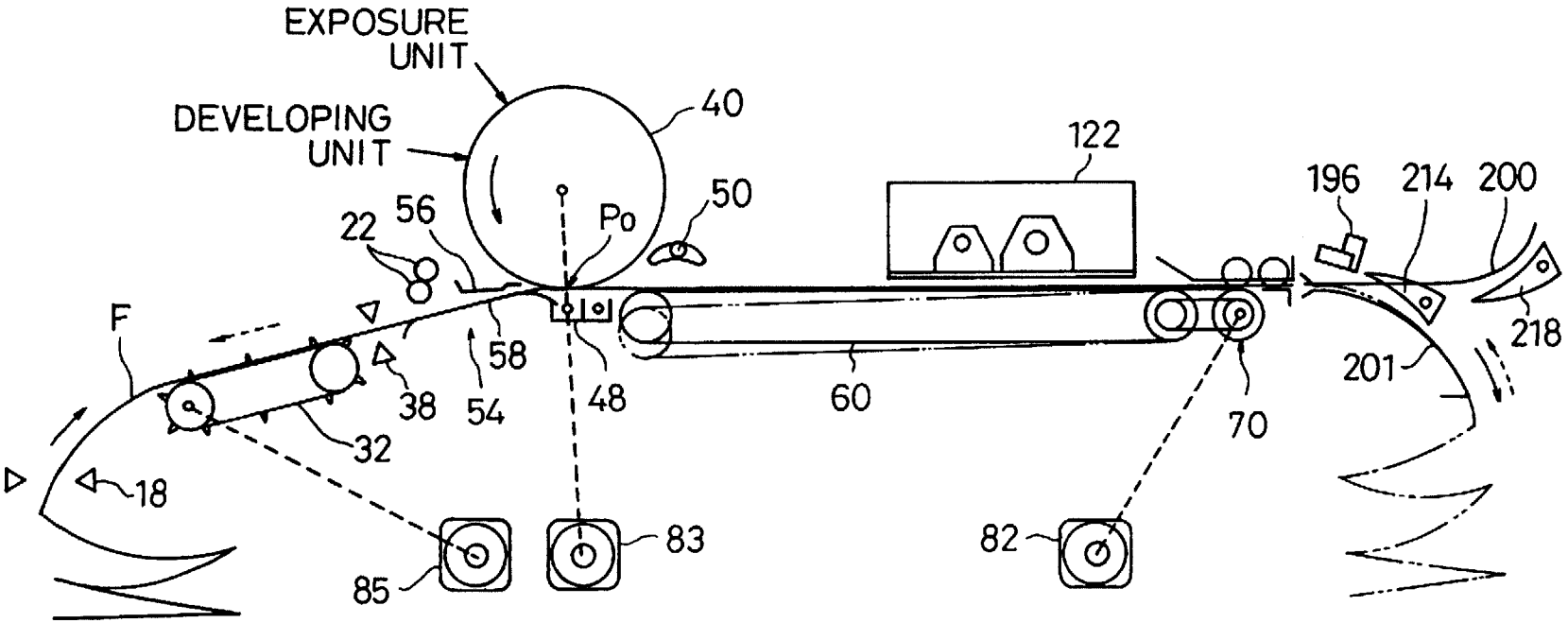
FIG. 18 shows a state in which the printing process for fanfold paper is started in the apparatus.

In FIG. 18, the fanfold paper F is drawn out by the tractor unit 32 and extends on the belt conveyer 60 of the printing section 8 to the end portion of the belt conveyer 60. That is, this state is set up after a selection signal for the fanfold paper F is supplied to the control circuit of the electrophotographic apparatus from the host computer or manual switch, the printing operation for the fanfold paper F in the preceding cycle is completed, and then the fanfold paper F is set again.

At this time, the feeding operation of the fanfold paper F is interrupted with one of the perforation lines aligned with the transferring position P0 of the photosensitive drum 40, and then the separation device 90 is lowered to set the confluence guide 54, transferring/de-electrifying unit 48 and belt conveyer 60 in positions separated from the photosensitive drum 40 and fixing unit 122. In this case, the first ejection gate 214 of the ejecting section 10 is set in the raised position.

If, in the above state, a printing starting signal is supplied from the host computer to the control circuit, the photosensitive drum 40 is rotated at a constant circumferential speed VD and the photosensitive surface is cleaned by the cleaning unit 52. When the cleaning operation is completed, the tractor unit 32 is driven in a reverse direction for a preset period of time by the electric motor 85 and then stopped. As a result, the fanfold paper F is drawn back towards the tractor unit 32 by a preset length as indicated by broken lines in FIG. 18. In this printing process, the electric motor 83 drives only the photosensitive drum 40 and the power transmission path between the electric motor 83 and the feed rollers 22 is cut off.

Figure 19:
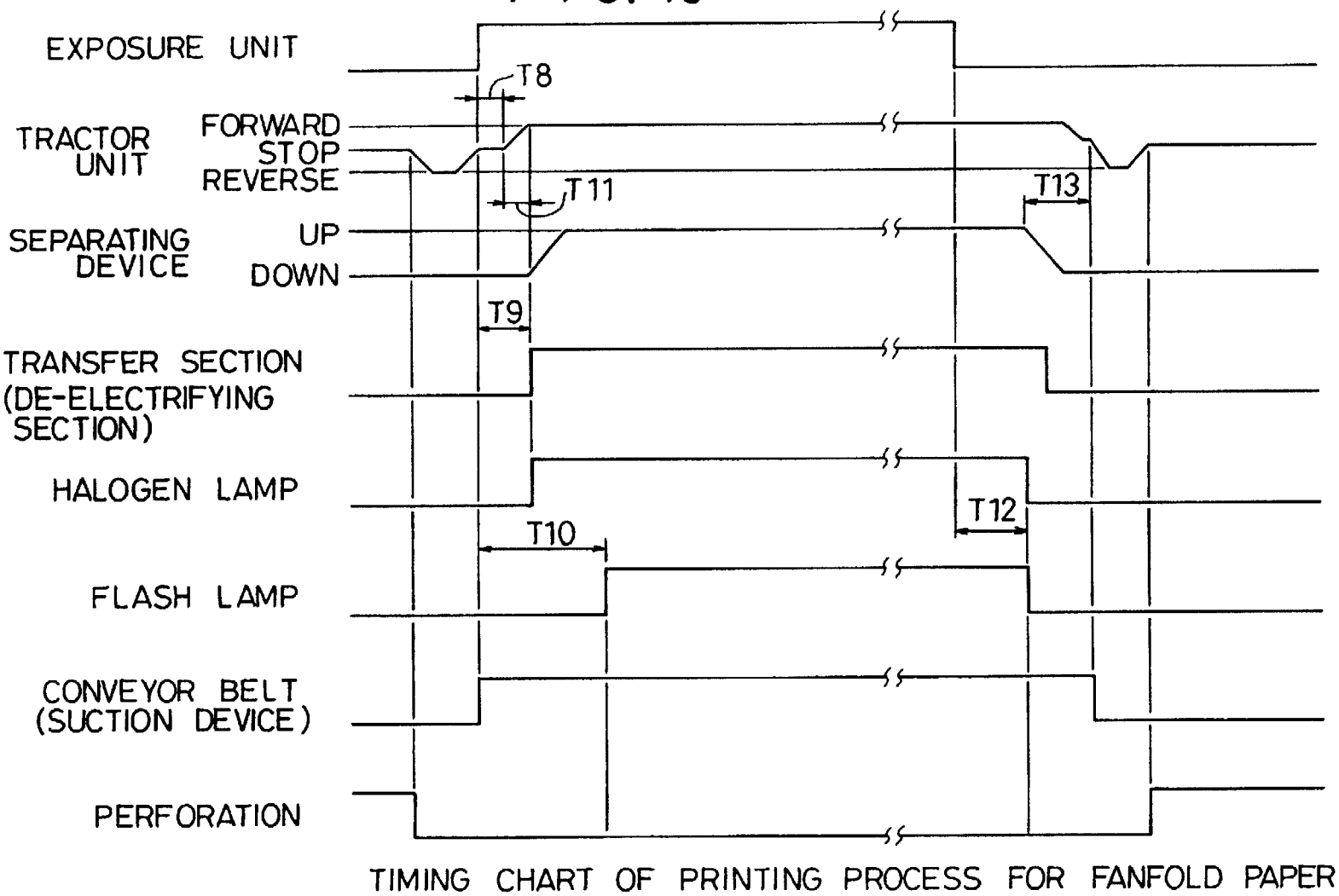
FIG. 19 is a timing chart showing the operation effected in the printing mode for fanfold paper.

As shown in FIG. 19, the belt conveyer 60 and scuff roller unit 70 start to be driven at the same time as the interruption of the tractor unit 32 and the feeding speed thereof is set to VC1. The electric motor 82 which is the driving source for the belt conveyer 60 and scruff roller unit 70 is controlled to set the feeding speed VC1 higher than the circumferential speed of the photosensitive drum 40 by approx. 10%. The suction device 68 of the belt conveyer 60 is also operated at the same time that the belt conveyer 60 is driven.

At the same time as the driving of the belt conveyer 60 and scuff roller unit 70, the exposure unit 44 starts the writing operation of an electrostatic latent image on the photosensitive surface of the drum 40 according to image data from the host computer.

After the writing operation of an electrostatic latent image by the exposure unit 44 has started and when time T8 has passed from the starting time of the image writing operation which is set as a reference timing, the tractor unit 32 is driven in the forward direction to start the feeding operation for the fanfold paper F. The feeding speed VT of the fanfold paper F fed by the tractor unit 32 is set equal to the circumferential speed VD of the photosensitive drum 40. When time T9 has passed after the starting time of the image writing operation, the transferring/de-electrifying unit 48 and the halogen lamp 128 of the fixing unit 122 are simultaneously operated, and when time T10 has passed, the flash lamp 130 of the fixing unit 122 is operated.

The timing at which the operation of the flash lamp 130 is started is set equal to the timing at which the perforation line of the fanfold paper F drawn back towards the tractor unit 32 from the transferring position P0 reaches the transferring position P0 again.

By effecting the above timing control, the toner image on the fanfold paper F which is not yet subjected to the fixing process in the printing process of the preceding cycle, that is, the toner image on the fanfold paper F left behind in a portion of the feeding path between the photosensitive drum 40 and the fixing unit 122 can be securely fixed. Therefore, the operation starting timing of the flash lamp in the printing process for the fanfold paper F is set to a timing which is earlier than that in the case of printing process for the cut sheet C.

The operation timing of the transferring/de-electrifying unit 48 and the halogen lamp 128 is the same as that set in the case of printing process for the cut sheet C.

As described before, when the tractor unit 32 is driven after the time T8 has passed from the operation starting time of the belt conveyer 60 and scruff roller unit 70, that is, the starting time of writing operation of an image on the photosensitive drum 40, the tractor unit 32 effects the constant-speed driving operation to feed the fanfold paper F at the constant speed VT. When the tractor unit 32 is set into the constant-speed driving mode, that is, when time T11 has passed after the starting time, the separation device 90 is moved to the raised position to raise the confluence guide 54, transferring/de-electrifying unit 48 and belt conveyer 60 to the respective operative positions, that is, the printing position.

Therefore, the fanfold paper F is guided into the confluence guide 54 at the constant feeding speed VT by the tractor unit 32 and then forcedly guided to the transferring position of the photosensitive drum 40.

Then, when the toner image on the photosensitive surface of the drum 40 reaches the transferring position P0 after the perforation line of the fanfold paper F which was drawn back towards the tractor unit 32 has passed the transferring position P0, the toner image is transferred from the photosensitive drum 40 to the fanfold paper F and then fixed by the fixing unit 122 in the same manner as in the case of the cut sheet C. After this, the printed fanfold paper F is folded and stacked in the paper ejecting stacker 226 of the ejecting section 10.

Since the feeding speed VC1 of the belt conveyer 60 and scuff roller unit 70 is set higher than the feeding speed VT of the tractor unit 32, the fanfold paper F is fed with a slip on the belt conveyer 60 and the supporting roller of the scuff roller unit 70 while receiving a suction force in the belt conveyer 60. Thus, since the fanfold paper F is fed under tension, the printing surface of the fanfold paper F is made flat without fail in the transferring position P0 and the fixing position, thereby making it possible to stably fix the toner image.

When all of the image data to be printed is supplied from the host computer to the exposure unit 44 and the image writing operation by the exposure unit 44 is completed as shown in FIG. 19, the operation of the halogen lamp 128 and flash lamp 130 of the fixing unit 122 is interrupted when time T12 has passed after the time of completion, and at the same time, the separation device 90 starts to be moved to the lowered position so that the confluence guide 54, transferring/de-electrifying unit 48 and belt conveyer 60 will start to be separated from the photosensitive drum 40 and the fixing unit. However, even if the downward movement of the separation device 90 is started, the operation of feeding out the fanfold paper F is continuously effected at this time and the perforation line of the fanfold paper F crosses the transferring position P0 and is further fed.

When time T13 has passed after the starting time of the downward movement of the separation device 90, the tractor unit 32 is decelerated, stopped and driven in the reverse direction to draw back the fanfold paper F by a preset length Thus, the perforation line of the fanfold paper F is aligned with the transferring position P0 of the photosensitive drum 40. The operation of aligning the perforation line of the fanfold paper F with respect to the transferring position P0 can be attained by controlling the operation of the tractor unit 32 according to the count of the counter 36. Further, the time in which the belt conveyer 60 and suction device 68 are stopped is set equal to the time in which the tractor unit 32 is temporarily stopped.

If fanfold paper F set on the tray 16 in the stacking section 4 is used up in the printing operation for the fanfold paper F and the rear end of the fanfold paper F is detected by the end sensor 18, the electric motor 82 for the belt conveyer 60 and scuff roller unit 70 is decelerated after the time of rear end detection or in a period from the time of rear end detection until the rear end of the fanfold paper F passes the tractor unit 32, and the feeding speed of the conveyer belt 60 is lowered to the feeding speed VC0 which is the same as the circumferential speed VD of the photosensitive drum 40. Therefore, even if the rear end of the fanfold paper F passes the tractor unit 32, the fanfold paper F is fed at the same feeding speed as the feeding speed of the tractor unit 32 so that the toner image can be stably transferred to and fixed on the fanfold paper F to the last page. The feeding speed of the belt conveyer 60 is lowered instantaneously or gradually after the time of rear end detection.

Next, the process effected after the printing process for the fanfold paper F is completed in the electrophotographic apparatus is explained.

Figure 20:
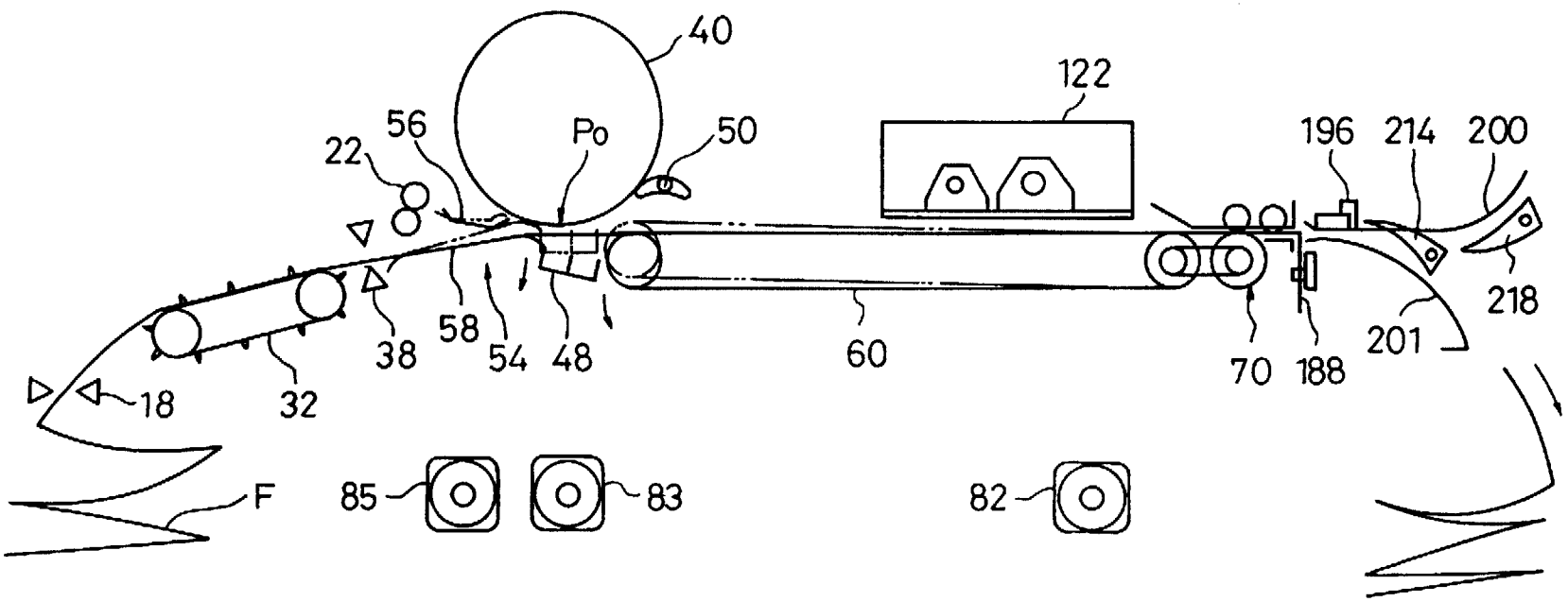
FIG. 20 shows a state in which the printing mode for fanfold paper is completed in the apparatus.
Figure 21:
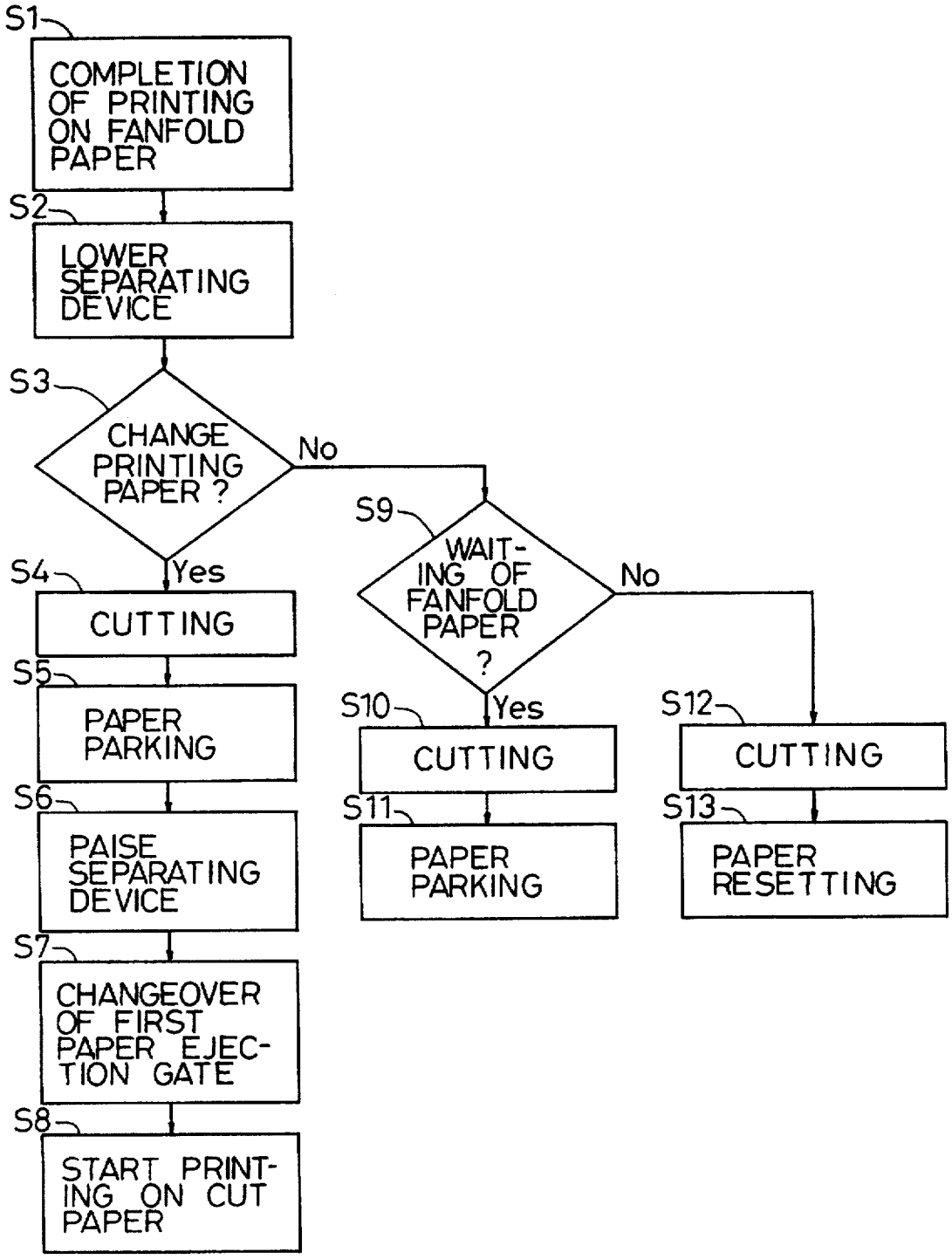
FIG. 21 is a flowchart showing the steps of a process effected after the printing mode for fanfold paper is completed.

First, when the printing process for the fanfold paper F is completed, the separation device 90 is moved downwardly, and as a result, the confluence guide 54, transferring/de-electrifying unit 48 and belt conveyer 60 are set in positions separated from the photosensitive drum 40 and the fixing unit 122 in the downward direction as indicated by a solid line in FIG. 20. FIG. 21 is a flowchart showing the steps of the post-processing, and in this flowchart, the steps S1 and S2 are already effected.

If a selection signal for cut sheet C is output from the host computer or the manual switch of the electrophotographic apparatus, the result of determination in the step S3 is "YES" and the cutting process (step S4) of the fanfold paper F is effected.

In the cutting process, the tractor unit 32 is driven in the forward direction to feed the fanfold paper F until the perforation line which has been aligned with the transferring position P0 reaches a position of the cutting device 172. At this time, the halogen lamp 128 and flash lamp 130 are operated. As a result, the toner image on the fanfold paper F left behind between the photosensitive drum 40 and the fixing unit 122 in the printing process of the preceding cycle can be securely fixed. After this, as shown in FIG. 13, the holding pads 196 of the cutting device 172 are lowered so that a down stream portion of the fanfold paper F which lies on the downstream side of the perforation line may be held between the holding pads 196 and the lower guide plate 201. On the other hand, an upstream portion of the fanfold paper F which lies on the upstream side of the perforation line is held between the supporting roller 72 of the scuff roller unit 70 and the free rollers 74.

Thus, the portions of the fanfold paper F which lie on the upstream side and downstream side with respect to the perforation line are held.

Figure 22:
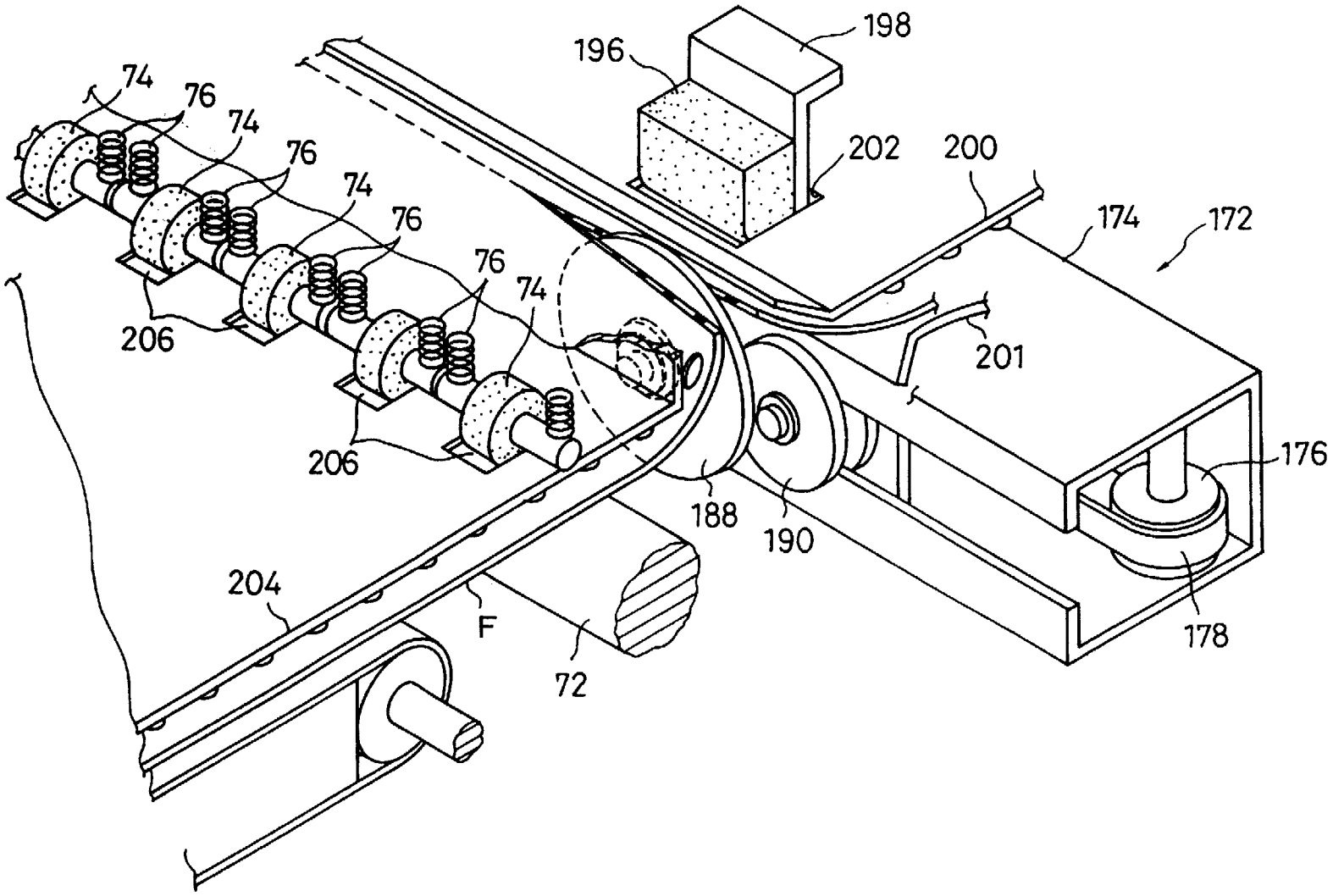
FIG. 22 is a perspective view of the cutting device set in the state shown in FIG. 13.

If, in this condition, the driving belt 178 of the cutting device 172 is driven, the cutter disk 188 which has been set in the standby position is guided by the paired guide wheels 190 and moved along the perforation line of the fanfold paper F. Since the cutter disk 188 projects upwardly to a level higher than the feeding path of the fanfold paper F, the cutter disk 188 moves while it is pushing up the perforation line of the fanfold paper F as shown in FIG. 22. Since the portions of the fanfold paper F which lie on the upstream side and downstream side with respect to the perforation line are held, a pulling force is applied to the perforation line by the pushing-up of the cutter disk 188 and the end portion thereof is cut apart. If a cut is thus made in the end portion of the perforation line, the portion of the perforation line is easily cut apart when the cutter disk 188 moves along the perforation line while rotating, and as a result, the fanfold paper F is completely cut off at the perforation line. After this, the driving belt 178 is driven in the reverse direction, the cutter disk 188 is returned to the standby position and the holding pads 196 are raised.

After the fanfold paper F is cut apart, that portion of the fanfold paper F which lies on the upstream side is fed towards the ejecting section 10 and folded and stacked on the paper ejecting stacker 226.

Unlike a blade, the outer peripheral portion of the cutter disk 188 is not sharp and is set in area-contact with a portion of the perforation line of the fanfold paper F with a constant width. Therefore, even when the outer periphery of the cutter disk 188 is not precisely positioned at the perforation line of the fanfold paper F, a portion of the fanfold paper F which lies near the perforation line is pushed upwardly by the cutter disk 188 so that the fanfold paper F can be cut apart at the perforation line which is a weak portion of the fanfold paper F.

Since the cutter disk 188 moves while rotating, the fanfold paper F can be smoothly cut apart at the perforation line by applying a pushing force thereto, but it is also possible to cut apart the fanfold paper F at the perforation line by use of the triangular plate 212 of the cutting device shown in FIG. 14 to apply a pushing force thereto.

Figure 23:
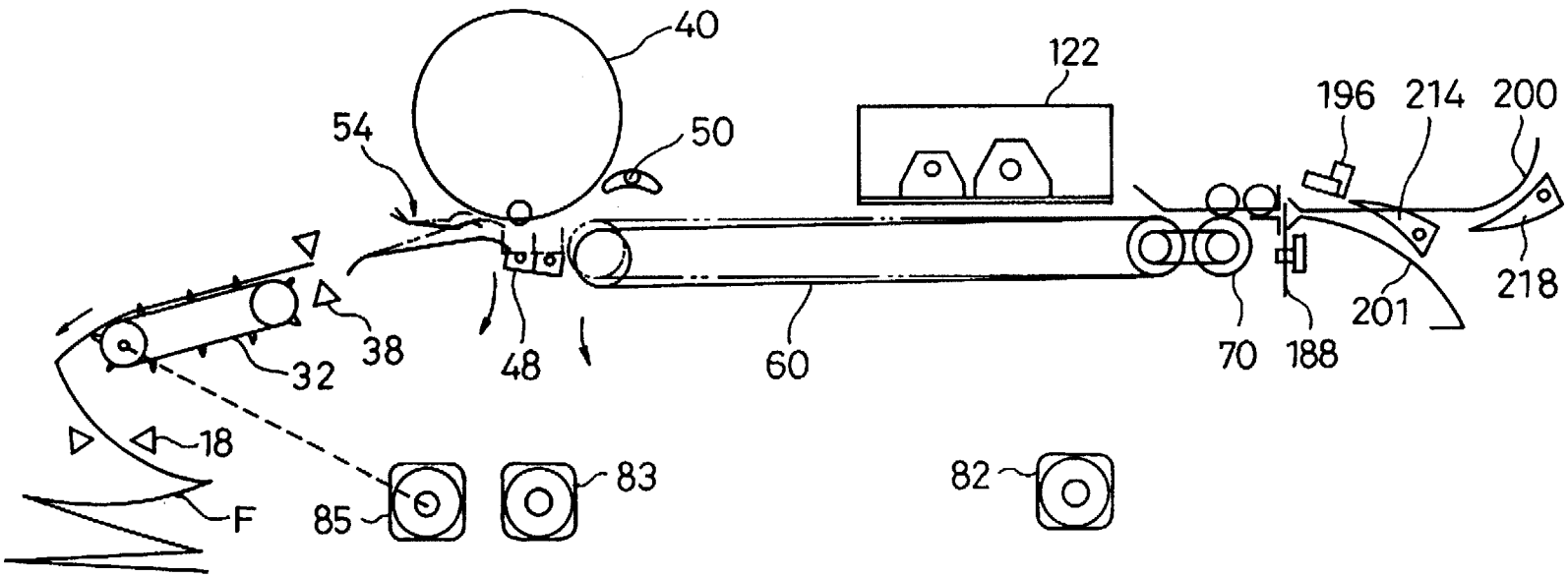
FIG. 23 shows a state in which paper parking of FIG. 21 is completed in the apparatus.

When the cutting process is completed, the tractor unit 32 is driven in the reverse direction to draw back the fanfold paper F which is left on the belt conveyer 60. When the cut end of the fanfold paper F is detected by the end sensor 38, the operation of the tractor unit 32 is interrupted and the fanfold paper F is set in the standby state as shown in FIG. 23. That is, at this timing, the paper parking is completed (step S5). The standby position of the fanfold paper F may be set to any position if it does not obstruct the passage of the cut sheet C, and therefore, the cut end of the fanfold paper F is not necessarily set in the position of the end sensor 38 but may be set within the confluence guide 54.

After this, the separation device 90 is moved upwardly to the raised position (step S6) and the first ejection gate 214 of the ejecting section 10 is set to the lowered position (step S7) so as to make ready for the printing process for the cut sheet C as described before (step S8).

When the result of determination in the step S3 is "NO", whether the fanfold paper F is set to the standby position or not is determined (step S9), and if the result of determination is "YES", the cutting process and paper parking which are respectively similar to the steps S4 and S5 are sequentially effected (steps S10 and S11). Therefore, at this stage, the operation of exchanging the fanfold paper F can be effected. Determination in the step S9 is effected according to an instruction signal from the host computer or manual switch.

If the result of determination is "NO", the cutting process is effected (step S12) and then the fanfold paper F is set again (step S13). In the step of setting the fanfold paper F again, a perforation line of the fanfold paper F is aligned with the transferring position.

Next, the procedure effected from the time when the fanfold paper F is set in the paper parking state until the fanfold paper F is automatically set is explained. In this case, the separation device 90 is set in the lowered position.

In the automatically setting operation, the tractor 32 is first driven in the forward direction and the fanfold paper F is supplied towards the confluence guide 54. After the front end of the fanfold paper F is detected by the end sensor 38, the feeding length of the fanfold paper F which has passed the end sensor 38 is continuously calculated by means of the rotary encoder 34 and the counter 36.

Figure 24:
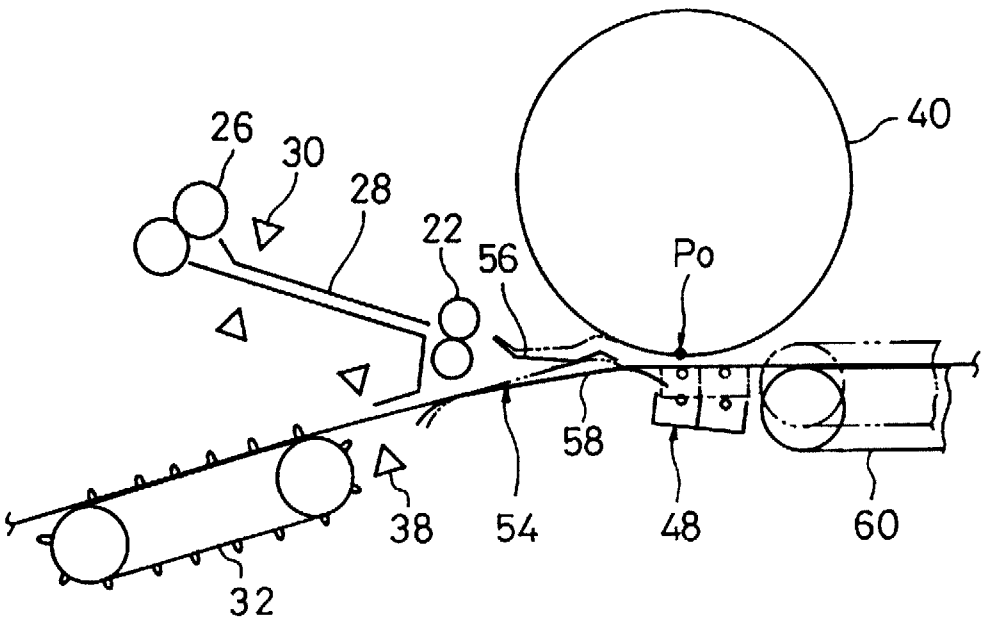
FIG. 24 shows a state in which fanfold paper set in the paper parking state is fed out for automatic setting.
Figure 25:
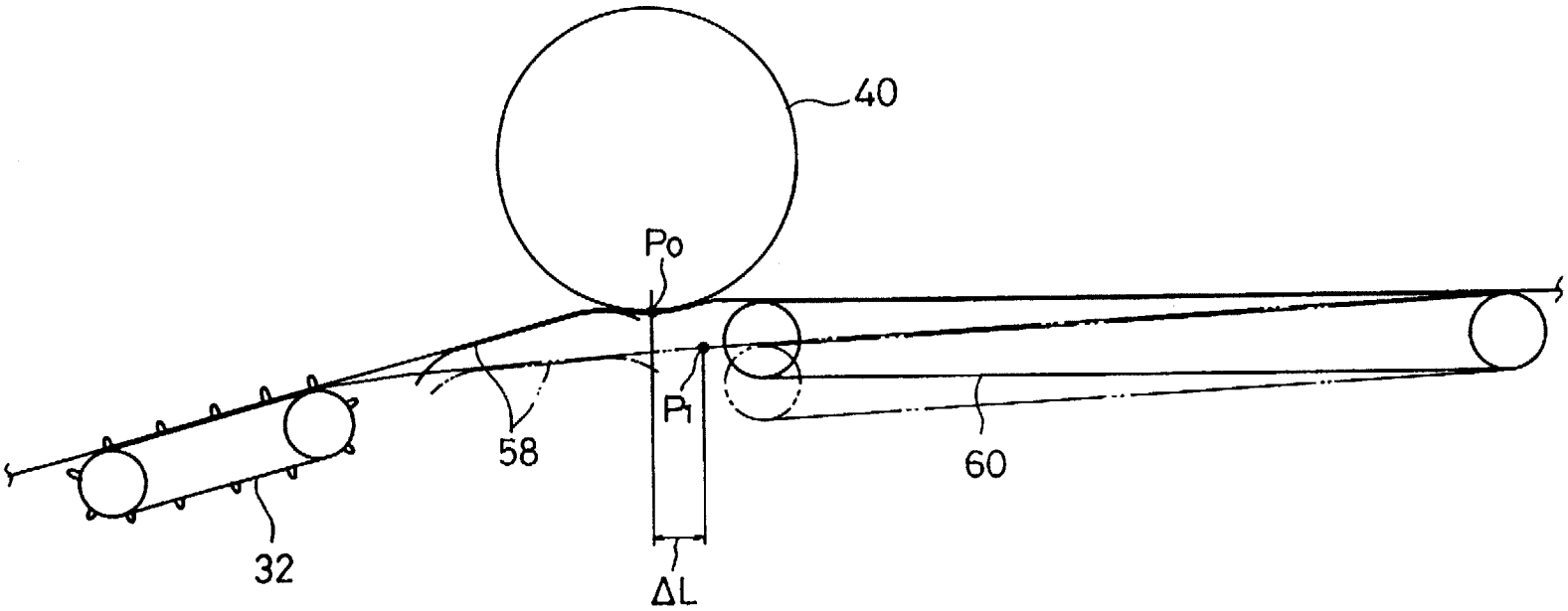
FIG. 25 shows the operation of effecting the alignment for perforation line of the fanfold paper at the time of automatically setting the fanfold paper.

Since the front end of the fanfold paper F strikes against the upper guide plate 56 of the confluence guide 54 set in the lowered position as indicated by two-dot-dash lines in FIG. 24, the traveling direction thereof is restricted. Therefore, the front end of the fanfold paper F is guided by the confluence guide 54 and passes through between the photosensitive drum 40 and the transferring/de-electrifying unit 48. Also, when the fanfold paper F passes through the photosensitive drum 40, the front end portion of the fanfold paper F will not be wound on the photosensitive drum 40 if the peeling claw 50 is set in contact with the photosensitive drum 40.

The fanfold paper F is further fed on the belt conveyer 60, and if the front end thereof is detected by the detector 210 (refer to FIGS. 1 and 5) immediately after having passed through the scuff roller unit 70, the operation of the tractor unit 32 is interrupted when one perforation line of the fanfold paper F is aligned with the transferring position according to the feeding length of the fanfold paper F by the tractor unit 32.

Since the separation device 90 is set in the lowered position as described before, the feeding path of the fanfold paper F is changed when the separation device 90 is moved upwardly to the raised position even if the perforation line of the fanfold paper F has been aligned with the transferring position P0 according to the feeding length, and the perforation line is deviated from the transferring position P0 towards the tractor unit 32. Therefore, in this case, the upward movement of the separation device 90 is taken into consideration, and the perforation line of the fanfold paper F is aligned with an imaginary transferring position P1 which is deviated from the transferring position P0 towards the downstream side by a preset length $\Delta L$. As a result, the perforation line is precisely aligned with the transferring position P0 when the separation device 90 is moved upwardly to the raised position.

When the automatic setting operation for the fanfold paper F is completed, the printing process described before can be effected.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electrophotographic apparatus comprising:

first supplying means for supplying cut sheet as printing paper towards a common feeding path;

second supplying means for supplying continuous paper as printing paper towards said common feeding path;

feeding means for feeding the printing paper supplied from one of said first and second supplying means along said common feeding path;

image forming means for forming an electrostatic latent image on a photosensitive medium;

developing means for developing the latent image on the photosensitive medium into a toner image;

transferring means for transferring the toner image on said photosensitive medium onto the printing paper lying on said common feeding path at a present transferring position;

fixing means for fixing the transferred toner image on the printing paper at a preset fixing position on said common feeding path;

cutting means for cutting continuous paper at a cutting position set on a downstream side of the fixing position with respect to a feeding direction of the printing paper;

retracting means for drawing back the continuous paper which is left behind on said common feeding path after the continuous paper is cut apart to a position which lies on an upstream side of said common feeding path and does not prevent supply of the cut sheet by said first supplying means; and separating means for separating said common feeding path from said photosensitive medium and said fixing means when the continuous paper is moved in a reverse direction.

2. An apparatus according to claim 1, wherein said photosensitive medium is disposed on the upstream side of said common feeding path, and said first and second supplying means include a confluence guide disposed near the upstream side of said common feeding path, for guiding the cut sheet and continuous paper towards said common feeding path and moving means for moving said confluence guide towards and apart from said photosensitive medium.

3. An apparatus according to claim 2, further comprising means for operating said separating means in connection with said moving means.

4. An apparatus according to claim 1, wherein said photosensitive medium includes a rotatable drum having a peripheral surface as a photosensitive surface;

said first and second supplying means have a supplying speed of the printing paper which is the same as a moving speed of said photosensitive surface; and said feeding means feeds the printing paper along said common feeding path at one of first and second feeding speeds which are respectively set for different types of printing papers, said first feeding speed, used when the printing paper is cut sheet, being set equal to said moving speed and supplying speed, and said second feeding speed, used when the printing paper is continuous paper, being set to be higher than said moving speed and supplying speed.

5. An apparatus according to claim 4, wherein said feeding means includes detecting means for detecting the rear end of the continuous paper on said second supplying means and a driving source for lowering said second feeding speed to said supplying speed in a period from the time the detecting means has detected the rear end of the continuous paper until the rear end of the continuous paper passes said second supplying means.

6. An electrophotographic apparatus comprising:

first supplying means for supplying cut sheet as printing paper towards a common feeding path;

second supplying means for supplying fanfold paper as printing paper towards said common feeding path;

feeding means for feeding the printing paper supplied from one of said first and second supplying means along said common feeding path, said feeding means including a pair of feeding rollers rotatably arranged at a preset position on said common feeding path, the printing paper passing between the feeding rollers;

image forming means for forming an electrostatic latent image on a photosensitive medium;

developing means for developing the latent image on the photosensitive medium into a toner image;

transferring means for transferring the toner image on said photosensitive medium onto the printing paper lying on said common feeding path at a transferring position;

fixing means for fixing the transferred toner image on the printing paper at a fixing position on said common feeding path, the fixing position being set on an upstream side of the preset position with respect to a feeding direction of the printing paper; and cutting means for cutting fanfold paper at a cutting position set on a downstream side of the feeding rollers;

wherein said cutting means includes means for aligning one of perforation lines of the fanfold paper along which the fanfold paper is to be cut off with the cutting position; holding means for holding a portion of the fanfold paper which lies on a downstream side with respect to the aligned perforation line; and a cutting member for cutting off the fanfold paper at the aligned perforation line by pulling the fanfold paper in a direction perpendicular to the aligned perforation line while being moved along the aligned perforation line.

7. An apparatus according to claim 6, wherein said cutting means has a standby position which is set at one side of a feeding area of the printing paper and in which said cutting member is set in a non-operative mode.

8. An apparatus according to claim 7, wherein said cutting member is a disk which is movable along the aligned perforation line of the fanfold paper while being rotated as it contacts the fanfold paper.

9. An apparatus according to claim 6, wherein said apparatus further comprises retracting means for drawing back the fanfold paper which is left behind on said common feeding path after the fanfold paper is cut apart to a position which lies on an upstream side of said common feeding path and does not prevent supply of the cut sheet by said first supplying means.

10. An apparatus according to claim 9, further comprising separating means for separating said common feeding path from said photosensitive medium when the fanfold paper is moved in a reverse direction.

11. An apparatus according to claim 10, wherein said photosensitive medium is disposed on the upstream side of said common feeding path, and said first and second supplying means include a confluence guide disposed near the upstream side of said common feeding path, for guiding the cut sheet and fanfold paper towards said common feeding path and moving means for moving said confluence guide towards and apart from said photosensitive medium.

12. An apparatus according to claim 9, further comprising separating means for separating said common feeding path from said photosensitive medium and fixing means when the fanfold paper is moved in a reverse direction.

13. An apparatus according to claim 12, wherein said photosensitive medium is disposed on the upstream side of said common feeding path, and said first and second supplying means include a confluence guide disposed near the upstream side of said common feeding path, for guiding the cut sheet and fanfold paper towards said common feeding path and moving means for moving said confluence guide towards and apart from said photosensitive medium.

14. An apparatus according to claim 13, further comprising means for operating said separating means in connection with said moving means.

15. An apparatus according to claim 6, wherein said photosensitive medium includes a rotatable drum having a peripheral surface as a photosensitive surface;

said first and second supplying means have a supplying speed of the printing paper which is the same as a moving speed of said photosensitive surface; and said feeding means feeds the printing paper along said common feeding path at one of first and second feeding speeds which are respectively set for different types of printing papers, said first feeding speed, used when the printing paper is cut sheet being set equal to said moving speed and supplying speed, and said second feeding speed, used when the printing paper is fanfold paper, being set to be higher than said moving speed and supplying speed.

16. An apparatus according to claim 15, wherein said feeding means includes detecting means for detecting the rear end of the fanfold paper on said second supplying means and a driving source for lowering said second feeding speed to said supplying speed in a period from the time the detecting means has detected the rear end of the fanfold paper until the rear end of the fanfold paper passes said second supplying means.

17. An apparatus according to claim 6, wherein said fixing means includes a fixing unit for fixing the toner image on the printing paper while not contacting the printing paper.

18. An electrophotographic method comprising:

a supplying step of selecting one of cut sheet and continuous paper as a printing paper and supplying the selected printing paper towards a common feeding path;

a feeding step of feeding the printing paper supplied from said supplying step along said common feeding path;

an image forming step of forming an electrostatic latent image on a photosensitive medium;

a developing step of developing the latent image on said photosensitive medium into a toner image;

a transferring step of transferring the toner image onto the printing paper at a preset transferring position set on said common feeding path;

a fixing step of fixing the transferred toner image on the printing paper at a preset fixing position set on said common feeding path;

a cutting step of cutting apart the continuous paper at a cutting position defined on a downstream side of said fixing position in a feeding direction of the printing paper;

a separation step of separating said common feeding path from said photosensitive medium and a fixing unit for effecting said fixing step; and a retracting step of drawing back the continuous paper which is left behind on said common feeding path after the continuous paper is cut apart to a position which lies on an upstream side of said common feeding path and does not prevent supply of the cut paper.

19. A method according to claim 18, wherein said image forming step and developing step includes a process for moving said photosensitive medium; the printing paper is supplied towards said common feeding path at a supplying speed which is the same as a moving speed of said photosensitive medium in said supplying step; and, in said feeding step, the printing paper is fed by feeding means having a first feeding speed which is the same as said moving speed and supplying speed when the printing paper is cut paper and the printing paper is fed by the feeding means having a second feeding speed which is higher than said moving speed when the printing paper is continuous paper.

20. A method according to claim 19, further comprising a detection step of detecting the rear end of the continuous paper after the rear end of the continuous paper is subjected to said supplying step and before the rear end of the continuous paper is subjected to said feeding step; and a step of lowering a feeding speed of the continuous paper to said supplying speed in a period from the time the rear end of the continuous paper is detected in said detection step until the rear end of the continuous paper is supplied after being subjected to said supplying step.

21. An electrophotographic method comprising:

a supplying step of selecting one of cut paper and fanfold paper as a printing paper and supplying the selected printing paper towards a common feeding path;

a feeding step of feeding the printing paper supplied from said supplying step along said common feeding path, the printing paper passing between a pair of feeding rollers which are rotatably arranged at a present position on said common feeding path;

an image forming step of forming an electrostatic latent image on a photosensitive medium;

a developing step of developing the latent image on said photosensitive medium into a toner image;

a transferring step of transferring the toner image onto the printing paper at a transferring position set on said common feeding path, the transferring position being set on an upstream side of the preset position in a feeding direction of the printing paper;

a fixing step of fixing the transferred toner image on the printing paper at a fixing position between the transferring position and the present position on said common feeding path; and a cutting step of cutting apart the fanfold paper at a cutting position defined on a downstream side of the preset position on said common feeding path after said fixing step is effected;

wherein said cutting step includes a process for aligning one of perforation lines of the fanfold paper along which the fanfold paper is to be cut off with the cutting position; a holding process for holding a portion of the fanfold paper which lies on a downstream side with respect to the aligned perforation line; and a cutting process for cutting off the fanfold paper at the aligned perforation line by pulling the fanfold paper in a direction perpendicular to the aligned perforation line.

22. A method according to claim 21, further comprising a retracting step of drawing back the fanfold paper which is left behind on said common feeding path after said cutting step to a position which lies on an upstream side of said common feeding path and does not prevent supply of the cut paper in said supplying step.

23. A method according to claim 22, further comprising a retracting step effected before said retracting step, for separating said common feeding path from said photosensitive medium.

24. A method according to claim 22, further comprising a separating step effected before said retracting step, for separating said common feeding path from said photosensitive medium and a fixing unit for effecting said firing step.

25. A method according to claim 22, wherein said image forming step and developing step includes a process for moving said photosensitive medium; the printing paper is supplied towards said common feeding path at a supplying speed which is the same as a moving speed of said photosensitive medium in said supplying step; and, in said feeding step, the printing paper is fed by feeding means having a first feeding speed which is the same as said moving speed and supplying speed when the printing paper is cut paper and the printing paper is fed by the feeding means having a second feeding speed which is higher than said moving speed and supplying speed when the printing paper is fanfold paper.

26. A method according to claim 25, further comprising a detection step of detecting the rear end of the fanfold paper after the rear end of the fanfold paper is subjected to said supplying step and before the rear end of the fanfold paper is subjected to said feeding step; and a step of lowering the feeding speed of the fanfold paper in said feeding step to said supplying speed in a period from the time the rear end of the fanfold paper is detected in said detection step until the rear end of the fanfold paper is supplied after being subjected to said supplying step.

27. A method according to claim 21, wherein said fixing step is carried out by a fixing unit which fixes the toner image on the printing paper while not contacting the printing paper.

*28. A printing apparatus comprising:*

*first supplying means for supplying cut sheet as printing paper towards a common feeding path;*

*second supplying means for supplying continuous paper as printing paper towards said common feeding path;*

*feeding means for feeding the printing paper supplied from one of said first and second supplying means alone said common feeding path;*

*image forming means for forming an image on the printing paper at an image forming position;*

*cutting means for cutting continuous paper at a cutting position set on a downstream side of the image forming position with respect to a feeding direction of the printing paper;*

*retracting means for drawing back the continuous paper which is left behind on said common feeding path after the continuous paper is cut apart to a position which lies on an upstream side of said common feeding path and does not prevent supply of the cut sheet by said first supplying means; and*

*separating means for separating said common feeding path from the image forming means when the continuous paper is moved in a reverse direction.*

*29. The apparatus according to claim 28, wherein the image forming position is located on the upstream side of said common feeding path, and said first and second supplying means include a confluence guide disposed near the upstream side of said common feeding path, for guiding the cut sheet and continuous paper towards said common feeding path and moving means for moving said confluence guide towards and apart from the image forming position.*

*30. The apparatus according to claim 29, further comprising means for operating said separating means in connection with said moving means.*

*31. The apparatus according to claim 28, wherein said image forming means has an image forming speed in relation to the feeding of printing paper;*

*said first and second supplying means have a supplying speed of the printing paper which is the same as the image forming speed of said image forming means; and*

*said feeding means feeds the printing paper along said common feeding path at one of first and second feeding speeds which are respectively set for different types of printing papers, said first feeding speed, used when the printing paper is cut sheet, being set equal to said image forming speed, and said second feeding speed, used when the printing paper is continuous paper, being set to be higher than said image forming speed.*

*32. The apparatus according to claim 31, wherein said feeding means includes detecting means for detecting the rear end of the continuous paper on said second supplying means and a driving source for lowering said second feeding speed to said supplying speed in a period from the time the detecting means has detected the rear end of the continuous paper until the rear end of the continuous paper passes said second supplying means.*

*33. A printing apparatus comprising:*

*image forming means for forming an image on fanfold paper;*

*feeding means for feeding fanfold paper; and*

*cutting means for cutting the fanfold paper at a cutting position on a downstream side of said image forming means;*

*wherein said cutting means includes means for aligning a perforation line of the fanfold paper along which the fanfold paper is to be cut off with the cutting position; holding means for holding portions of the fanfold paper which respectively lie on upstream and downstream sides with respect to the aligned perforation line; and a cutting member for cutting off the fanfold paper at the aligned perforation line by pulling the fanfold paper in a direction perpendicular to the aligned perforation line while being moved along the aligned perforation line.*

*34. The apparatus according to claim 33, wherein said cutting means has a standby position which is set at one side of a feeding area of the fanfold paper and in which said cutting member is set in a non-operative mode.*

*35. The apparatus according to claim 34, wherein said cutting member is a disk which is moveable along the aligned perforation line of the fanfold paper while being rotated as it contacts the fanfold paper.*

*36. The apparatus according to claim 33, wherein said feeding means includes supplying means for supplying cut sheet one by one on which an image is formed by said image forming means, and a common feeding path on which the fanfold paper and cut sheet are fed from said image forming means toward the cutting position;*

*said apparatus further comprises retracting means for drawing back the fanfold paper which is left behind on*

*said common feeding path after the fanfold paper is cut apart to a position which lies on an upstream side of said common feeding path and does not prevent supplying of the cut sheet by said supplying means.*

*37. The apparatus according to claim 36, further comprising separating means for separating said common feeding path from said image forming means when the fanfold paper is moved in a reverse direction.*

*38. The apparatus according to claim 37, wherein said image forming means is disposed on an upstream end of said common feeding path, and said feeding means further includes a confluence guide disposed near the upstream end of said common feeding path, for guiding the cut sheet and fanfold paper towards said common feeding path; and moving means for moving said confluence guide towards and apart from said image forming means.*

*39. The apparatus according to claim 38, further comprising means for operating said separating means in connection with said moving means.*

*40. The apparatus according to claim 33, wherein said image forming means has an image forming speed in relation to the feeding of the fanfold paper;*

*said feeding means includes supplying means for supplying cut sheets one by one on which an image is formed by said image forming means, and a common feeding path for guiding one of the fanfold paper and cut sheet from said image forming means toward the cutting position, wherein said feeding means feeds the fanfold paper at a first supply speed towards said common feeding path and said supplying means feeds a cut sheet at a second supply speed towards said common feeding path, the first and second supply speeds being the same as the image forming speed of said image forming means;*

*said feeding means feeds one of the fanfold paper and cut sheet along said common feeding path from said image forming means toward the cutting position at one of first and second feeding speeds which are respectively set for the cut sheet and fanfold paper, said first feeding speed for the cut sheet being set equal to said image forming speed and said second feeding speed for the fanfold paper being set to be higher than said image forming speed.*

*41. The apparatus according to claim 40, wherein said feeding means further includes detecting means for detecting the rear end of the fanfold paper when the fanfold paper is fed at said first supply speed and a driving source for lowering said second feeding speed to said first supply speed in a period from the time the detecting means has detected the rear end of the fanfold paper until the rear end of the fanfold paper is fed at said second feeding speed.*

*42. A printing apparatus comprising:*

*image forming means for forming an image on continuous printing paper at an image forming position;*

*first feeding means for feeding the printing paper towards said image forming position;*

*second feeding means for feeding the printing paper towards a cutting position on a downstream side of said image forming position with respect to the feeding direction of the printing paper;*

*cutting means for cutting the printing paper at said cutting position; and*

*retracting means for drawing back the printing paper after the cutting process for the printing paper is completed so that the front edge of the printing paper is located at said image forming position when the printing paper is to be subjected to successive printing, or the front edge of the printing paper is located at a position when the printing paper is to be removed.*

*43. The apparatus according to claim 42, further comprising separating means for separating the printing paper from said image forming position towards a direction perpendicular to the face of the printing paper, and wherein said first feeding means includes means for compensating a deviation of the front edge of the printing paper in the feeding direction of the printing paper, the deviation being produced by the motion of said separating means after the cutting process for the printing paper is completed when the printing paper is to be subjected to successive printing.*

*44. A printing method comprising:*

*a first supplying step of supplying cut sheet as printing paper towards a common feeding path;*

*a second supplying step of supplying continuous paper as printing paper towards said common feeding path;*

*a feeding step of feeding the printing paper supplied by one of said first and second supplying steps along said common feeding path;*

*an image forming step of forming an image on the printing paper at an image forming position;*

*a cutting step of cutting continuous paper at a cutting position defined on a downstream side of the image forming position with respect to a feeding direction of the printing paper;*

*a retracting step of drawing back the continuous paper which is left behind on said common feeding path after the continuous paper is cut apart to a position which lies on an upstream side of said common feeding path and does not prevent supply of the cut sheet by said first supplying step; and*

*a separating step of separating said common feeding path from the image forming position when the continuous paper is moved in a reverse direction.*

*45. The method according to claim 44, wherein said first and second supplying steps includes a guiding process for guiding one of the cut sheet and continuous paper towards the image forming position by means of a confluence guide disposed on an upstream side of the image forming position and a moving process for moving said confluence guide towards and apart from the image forming position.*

*46. The method according to claim 45, wherein said separating step is executed in connection with said moving process.*

*47. The method according to claim 44, wherein*

*an image is formed at an image forming speed in relation to the feeding of printing paper in said image forming step;*

*the printing paper is supplied at a supplying speed which is the same as the image forming speed in one of said first and second supplying steps; and*

*the printing paper is fed along said common feeding path by said feeding step at one of first and second feeding speeds which are respectively set for different types of printing papers, said first feeding speed used for cut sheet being set equal to said image forming speed, and said second feeding speed used for the continuous paper being set to be higher than said image forming speed.*

*48. The method according to claim 47, wherein said feeding step includes a detecting process for detecting the rear end of the continuous paper, and a decelerating process for lowering said second feeding speed to said supplying*

*speed while the rear end of the continuous paper is supplied at said supplying speed after the rear end of the continuous paper has been detected by said detecting process.*

*49. A printing method comprising:*

*an image forming step of forming an image on fanfold paper at an image forming position;*

*a feeding step of feeding the fanfold paper; and*

*a cutting step of cutting the fanfold paper at a cutting position on a downstream side of said image forming position with respect to a feeding direction of the fanfold paper;*

*wherein said cutting step includes a aligning process for aligning a perforation line of the fanfold paper along which the fanfold paper is to be cut off with the cutting position; a holding process for holding portions of the fanfold paper which respectively lie on upstream and downstream sides with respect to the aligned perforation line, and a cutting process for cutting off the fanfold paper at the aligned perforation line by using a cutting member, said cutting member pulling the fanfold paper in a direction perpendicular to the aligned perforation line while being moved along the aligned perforation line.*

*50. The method according to claim 49, wherein said cutting member is set in a non-operative mode at a standby position which is set at one side of a feeding area of the fanfold paper before said cutting step is executed.*

*51. The method according to claim 50, wherein a disk as said cutting member is used;*

*said disk is moved along the aligned perforation line of the fanfold paper while being rotated as it contacts the fanfold paper in said cutting step.*

*52. The method according to claim 49, wherein said feeding step includes a supplying process for supplying cut sheet one by one on which an image is formed by said image forming step, the fanfold paper and cut sheet are fed along a common feeding path from said image forming position toward the cutting position; and*

*said method further comprises a retracting step of drawing back the fanfold paper which is left behind on said common feeding path after the fanfold paper is cut apart to a position which lies on an upstream side of said common feeding path and does not prevent supply of the cut sheet by said supplying process.*

*53. The method according to claim 52, further comprising a separating step of separating said common feeding path from said image forming position when the fanfold paper is moved in a reverse direction.*

*54. The method according to claim 53, wherein said feeding step further includes a guide process for guiding the cut sheet and fanfold paper towards said common feeding path by means of a confluence guide which is disposed on the upstream end of said image forming position and a moving process for moving said confluence guide towards and apart from said image forming position.*

*55. The method according to claim 54, wherein said separating step is executed in connection with said moving process.*

*56. The method according to claim 49, wherein an image is formed at an image forming speed in relation to the feeding of the fanfold paper in said image forming step;*

*said feeding step includes a supplying process for supplying cut sheets one by one on which an image is formed by said image forming step, one of the fanfold paper and cut sheet is fed along a common feeding path from said image forming position toward the cutting position in said feeding step, wherein the fanfold paper and cut sheet are supplied at a supply speed towards said common feeding path, respectively, said supply speed being the same as the image forming speed in said image forming step; and*

*one of the fanfold paper and cut sheet is fed along said common feeding path from said image forming position toward the cutting position in said feeding step at one of first and second feeding speeds which are respectively set for the cut sheet and fanfold paper, said first feeding speed for the cut sheet being set equal to said image forming speed, and said second feeding speed for the fanfold paper being set to be higher than said image forming speed.*

*57. The method according to claim 56, wherein said feeding step further includes a detecting process for detecting the rear end of the fanfold paper when the fanfold paper is fed at said supply speed and a deceleration process for lowering said second feeding speed to said supply speed while the rear end of the fanfold paper is fed at said supply speed after the rear end of the fanfold paper has been detected.*

*58. A printing method comprising:*

*an image forming step of forming an image on continuous printing paper at an image forming position;*

*a first feeding step of feeding the printing paper towards said image forming position;*

*a second feeding step of feeding the printing paper towards a cutting position on a downstream side of said image forming position with respect to a feeding direction of the printing paper;*

*a cutting step of cutting the printing paper at said cutting position; and*

*a retracting step of drawing back the printing paper after the cutting step is completed so that the front edge of the printing paper is located at said image forming position when the printing paper is to be subjected to successive printing, or the front edge of the printing paper is located at a position on the upstream side of said image forming position when the printing paper is to be removed.*

*59. The method according to claim 58, further comprising a separating step of separating the printing paper from said image forming position towards a direction perpendicular to the face of the printing paper, and wherein said first feeding step includes a process for compensating a deviation of the front edge of the printing paper in the feeding direction of the printing paper, the deviation being produced by said separating step after the cutting step is completed when the printing paper is to be subjected to successive printing.*

* * * * *